United States Patent
Kimura

(10) Patent No.: US 9,736,406 B2
(45) Date of Patent: Aug. 15, 2017

(54) IMAGE CAPTURING APPARATUS AND CONTROL METHOD THEREOF

(71) Applicant: CANON KABUSHIKI KAISHA, Tokyo (JP)

(72) Inventor: Takayuki Kimura, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/001,944

(22) Filed: Jan. 20, 2016

(65) Prior Publication Data

US 2016/0219229 A1    Jul. 28, 2016

(30) Foreign Application Priority Data

Jan. 22, 2015 (JP) ................... 2015-010676
Jan. 22, 2015 (JP) ................... 2015-010677

(51) Int. Cl.
*H04N 5/357* (2011.01)
*H04N 5/378* (2011.01)

(52) U.S. Cl.
CPC ............ *H04N 5/357* (2013.01); *H04N 5/378* (2013.01)

(58) Field of Classification Search
CPC ..................... H04N 5/357; H04N 5/378
See application file for complete search history.

(56) References Cited

U.S. PATENT DOCUMENTS

2013/0162874 A1* 6/2013 Hashimoto ............ H04N 5/243
348/300

FOREIGN PATENT DOCUMENTS

JP    2012-080252 A    4/2012
JP    2013-009087 A    1/2013

* cited by examiner

*Primary Examiner* — James Hannett
(74) *Attorney, Agent, or Firm* — Cowan, Liebowitz & Latman, P.C.

(57) ABSTRACT

Analog signals having different output levels are converted into a plurality of digital signals using a plurality of reference signals having mutually different slopes, and a ratio of the plurality of different slopes and an offset amount are calculated on the basis of the digital signals. Then, on a frame-by-frame basis, a correction coefficient for correcting digital signals obtained by carrying out analog-digital conversion on analog signals output from a pixel section of an image sensor is calculated on the basis of the ratio of slopes and the offset amount. The correction coefficient includes the ratio of slopes and an offset correction value, and the offset correction value is obtained by carrying out a filtering process that performs weighted adding of the offset amount and the offset correction value calculated in a previous frame using a cyclic coefficient.

23 Claims, 18 Drawing Sheets

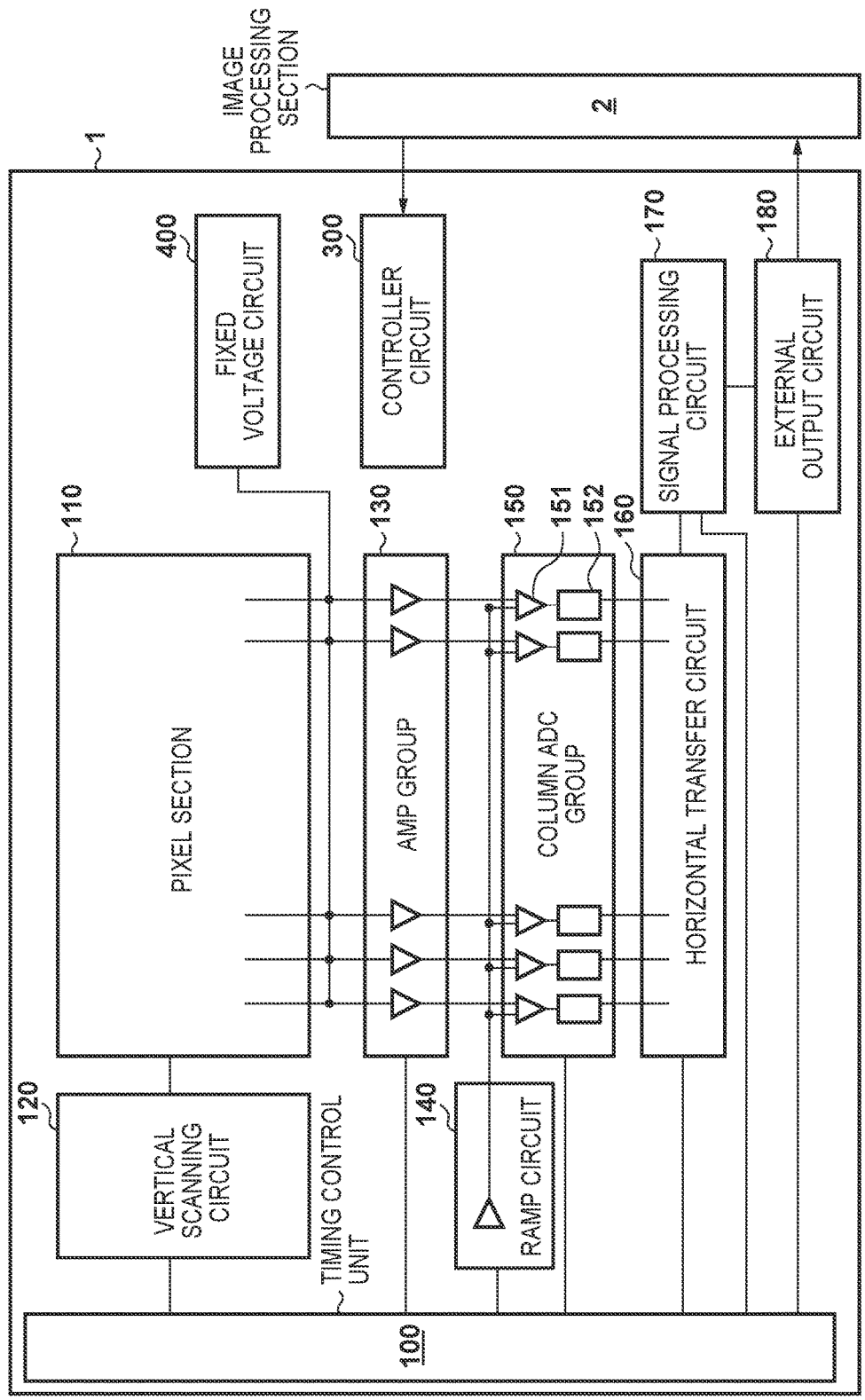

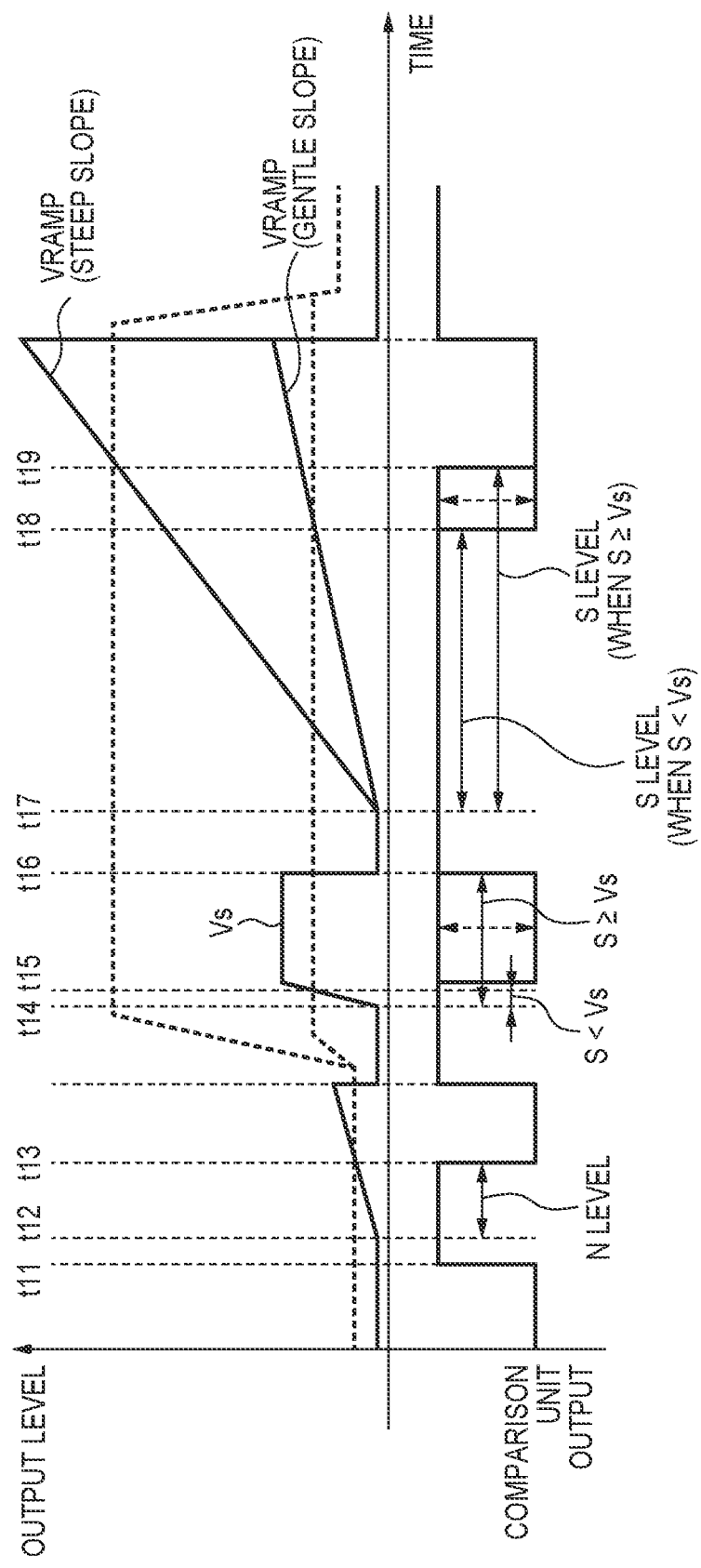

| OFFSET CORRECTION DIFFERENCE VALUE β(n)−βf(n−1) [LSB] | CYCLIC COEFFICIENT p |
|---|---|
| 0~10 | 0.1 |
| 11~12 | 0.2 |
| 13~14 | 0.3 |
| 15~16 | 0.4 |
| 17~20 | 0.5 |
| 21~25 | 0.6 |
| 26~33 | 0.7 |
| 34~50 | 0.8 |
| 51~100 | 0.9 |
| 101~ | 1.0 |

| FRAMERATE [fps] | CYCLIC COEFFICIENT p |
|---|---|
| 0.1~0.9 | 0.9 |
| 1~24 | 0.4 |
| 24~59 | 0.2 |
| 60~ | 0.1 |

| βf(n)− βf'(n) | MULTIPLIED VALUE q FOR CYCLIC COEFFICIENT |
|---|---|
| 0~10 | 1.0 |
| 15~30 | 0.5 |
| 31~ | 0.2 |

FIG. 15

| SUBJECT MOVEMENT AMOUNT | MULTIPLIED VALUE q FOR CYCLIC COEFFICIENT |
|---|---|
| HIGH | 4.0 |
| MEDIUM | 2.0 |
| LOW | 1.0 |

FIG. 16

| COLOR OF FILTER COLOR | MULTIPLIED VALUE q FOR CYCLIC COEFFICIENT |
|---|---|
| R (RED) | 2.0 |
| G (GREEN) | 1.0 |
| B (BLUE) | 2.0 |

FIG. 17

| SIGNAL LEVEL AFTER COLUMN AMP SWITCH [LSB] | MULTIPLIED VALUE q FOR CYCLIC COEFFICIENT |
|---|---|
| 0~511 | 1.0 |
| 512~2047 | 2.0 |
| 2048~4095 | 4.0 |

F I G. 21A
| DETECTED DIFFERENCE VALUE V1H(n)-V1Hf(n-1) [LSB] | CYCLE COEFFICIENT p |
|---|---|
| 0~10 | 0.1 |
| 11~12 | 0.2 |
| 13~14 | 0.3 |
| 15~16 | 0.4 |
| 17~20 | 0.5 |
| 21~25 | 0.6 |
| 26~33 | 0.7 |
| 34~50 | 0.8 |
| 51~100 | 0.9 |
| 101~ | 1.0 |
F I G. 21B
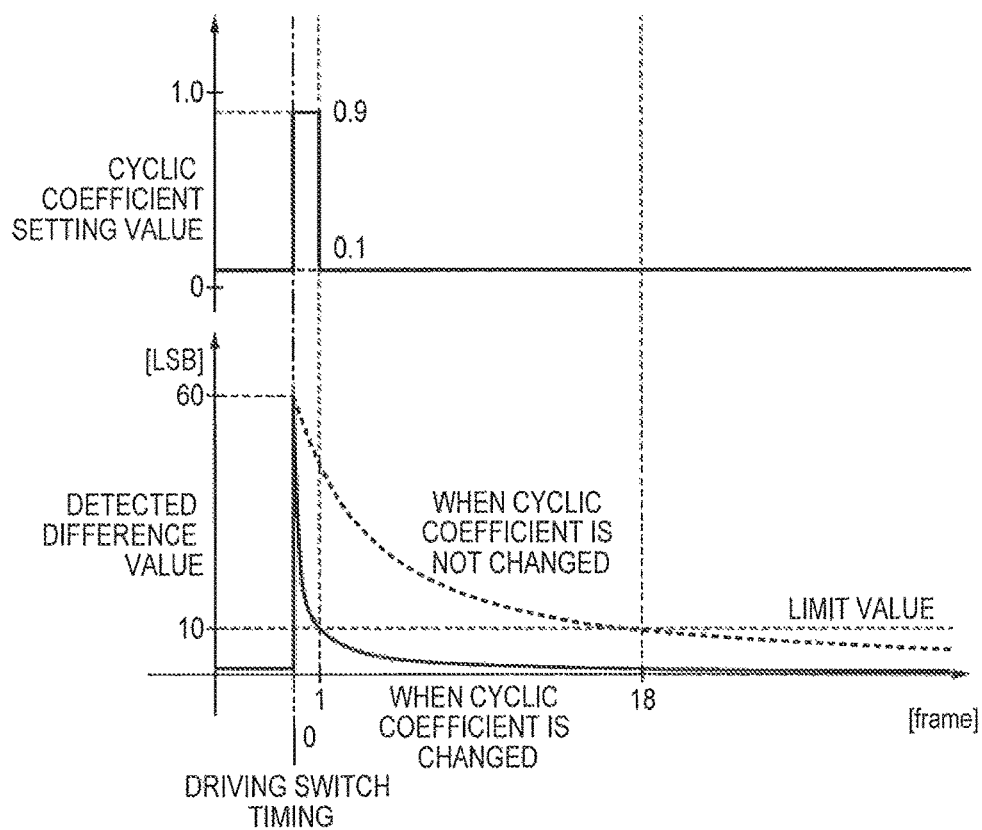

IMAGE CAPTURING APPARATUS AND CONTROL METHOD THEREOF

BACKGROUND OF THE INVENTION

Field of the Invention

The present invention relates to image capturing apparatuses and control methods thereof, and particularly relates to an image capturing apparatus that converts an analog signal read out from an image sensor into a digital signal and to a control method thereof.

Description of the Related Art

Conventionally, a television standard called "full high-definition", in which there are 1,920 horizontal pixels and 1,080 vertical pixels, has been commonly used. However, recent years have seen a continuing transition to a television standard called "4K2K", in which there are 3,840 horizontal pixels and 2,160 vertical pixels. Further transitions to a next-generation television standard called "8K4K" ("ultra-high-definition"), in which there are 7,680 horizontal pixels and 4,320 vertical pixels, are expected in the future. As the number of pixels increases, framerates continue to increase as well.

The transition to such television standards has resulted in increased demand for more pixels and higher framerates in image capturing apparatuses that shoot video for television, and increasing the speed at which an image sensor reads out such video is an issue with respect to meeting such demand. To increase the readout speed, it is absolutely necessary to increase the processing speed of an AD converter provided in the image sensor, and a variety of techniques have been proposed with respect to increasing the speed of an AD converter.

In addition to increasing the readout speed, there is also high demand for an improvement in tone accuracy with the aim of improving S/N ratios and expanding dynamic ranges. Thus improving the tone accuracy without increasing circuit scales, lengthening processing times, and so on is an important issue with regards to future improvements in image quality.

Japanese Patent Laid-Open No. 2012-080252 discloses an image capturing apparatus having the following configuration for responding to such an issue. A first pixel signal obtained by amplifying a pixel signal at a first gain and a second pixel signal obtained by amplifying the pixel signal at a second gain that is greater than the first gain using a column amp circuit within the image sensor are AD (analog-digital) converted using different AD converter circuits. Then, one of the AD-converted first pixel signal and second pixel signal is selectively output in accordance with the level of the pixel signal. Employing such a configuration makes it possible to expand the dynamic range and improve the S/N ratio.

Japanese Patent Laid-Open No. 2012-080252 furthermore proposes a technique that level-shifts the selectively read-out first pixel signal and second pixel signal to the same gain level, detects gain error or offset error, and corrects the pixel signal on the basis of the detected value. By carrying out such processing, signal level gaps produced when combining the selectively read-out first pixel signal and second pixel signal into a single image can be reduced.

However, Japanese Patent Laid-Open No. 2012-080252 does not take into consideration variations (fluctuation) in correction values calculated using the detected values and variations (fluctuations) over time in the detected values for calculating gain error and offset error. Sudden changes in temperature, switching methods of driving the image sensor, noise in the power source supplied to column amps, noise in interconnects, external noise (magnetic noise produced during motor driving jumping in, for example), and so on are the main causes of fluctuations in correction values and detected values. Signal level gaps will be visible if the first pixel signal and the second pixel signal are combined into a single image as disclosed in Japanese Patent Laid-Open No. 2012-080252 with the correction values having fluctuated due to such causes. Signal level gaps will also be visible if the gain error and offset error are calculated with the detected values having fluctuated and the pixel signals of effective pixels are corrected using those calculated values, and the first pixel signal and the second pixel signal are combined into a single image as disclosed in Japanese Patent Laid-Open No. 2012-080252.

For example, in the case of a correction method in which a correction value is calculated on a frame-by-frame basis and updated, a visually unnatural video will be produced if frames having signal level gaps and frames not having signal level gaps are both present.

Meanwhile, in the case of a method that calculates an individual correction value for each of regions obtained by dividing an image of a single frame and corrects using those correction values, regions having gaps and regions not having gaps will be present from region to region, again resulting in a visually unnatural image. Likewise, in the case where an individual detected value is obtained for each of regions obtained by dividing an image of a single frame and each region is then corrected using a correction value calculated from that detected value, regions having gaps and regions not having gaps will be present from region to region, resulting in a visually unnatural image. This is particularly noticeable in video in which the subject contrast is low and the brightness level changes gradually.

SUMMARY OF THE INVENTION

The present invention has been made in consideration of the above situation, and prevents unnatural video such as where signal level gaps arise, gap levels change, and so on from frame to frame or among regions within an image.

According to the present invention, provided is an image capturing apparatus comprising: an analog-digital conversion unit that converts an analog signal into a digital signal using a plurality of reference signals having mutually different slopes; a voltage supply unit that supplies, to the analog-digital conversion unit, analog signals having a predetermined plurality of different output levels; and a calculation unit that calculates a ratio of the plurality of different slopes and an offset amount on the basis of a plurality of digital signals obtained by converting the analog signals having the plurality of different output levels using the plurality of reference signals, and calculates, on a frame-by-frame basis, a correction coefficient for correcting digital signals obtained by the analog-digital conversion unit converting analog signals output from a pixel section of an image sensor on the basis of the ratio of slopes and the offset amount, wherein the correction coefficient includes the ratio of slopes and an offset correction value, and the offset correction value is obtained by carrying out a filtering process that performs weighted adding of the offset amount and the offset correction value calculated in a previous frame using a cyclic coefficient.

According to the present invention, provided is a control method for an image capturing apparatus, the method comprising: supplying, to an analog-digital conversion unit, analog signals having a predetermined plurality of different output levels; converting the analog signals having the plurality of different output levels into a plurality of digital signals using a plurality of reference signals having mutually different slopes; calculating a ratio of the plurality of different slopes and an offset amount on the basis of the plurality of digital signals; and calculating, on a frame-by-frame basis, a correction coefficient for correcting digital signals obtained by carrying out analog-digital conversion on analog signals output from a pixel section of an image sensor on the basis of the ratio of slopes and the offset amount, wherein the correction coefficient includes the ratio of slopes and an offset correction value, and the offset correction value is obtained by carrying out a filtering process that performs weighted adding of the offset amount and the offset correction value calculated in a previous frame using a cyclic coefficient.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram illustrating the overall configuration of an image sensor used in an image capturing apparatus according to an embodiment of the present invention;

FIG. 3 is a timing chart illustrating AD conversion operations according to an embodiment;

FIG. 15 is a diagram indicating cyclic coefficients in the case where the cyclic coefficient is changed in accordance with a movement amount of a subject, according to an embodiment;

FIG. 16 is a diagram indicating cyclic coefficients in the case where the cyclic coefficient is changed in accordance with the color of a color filter, according to an embodiment;

FIG. 17 is a diagram indicating cyclic coefficients in the case where a reference signal level is changed in accordance with gain switching in a column amp, according to an embodiment;

FIGS. 21A and 21B are diagrams for explaining cyclic coefficient setting values when power is turned on and when an image sensor driving method is switched according to the third embodiment.

DESCRIPTION OF THE EMBODIMENTS

Figure 2A:
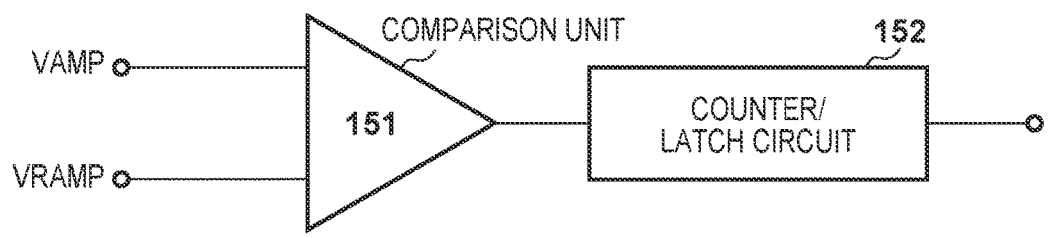
FIGS. 2A and 2B are diagrams illustrating the overall configuration and operational timing of a column amp group of the image sensor.

Exemplary embodiments of the present invention will be described in detail in accordance with the accompanying drawings.

First Embodiment

FIG. 1 is a block diagram illustrating the configuration of an image sensor 1 used in an image capturing apparatus according to a first embodiment of the present invention, and shows the image sensor 1 and an image processing section 2 that is an output destination for image data obtained by the image sensor 1. The image sensor 1 according to the first embodiment is a CMOS image sensor provided with a parallel-type AD converter. The image processing section 2 carries out developing processes such as white balance processing, gamma processing, and so on on the image data output by the image sensor 1, and ultimately records the data into a recording medium. The image processing section 2 includes a CPU, and the CPU communicates with (through serial communication, for example) and controls the image sensor 1 in accordance with an operating mode of the image capturing apparatus.

In the image sensor 1, a timing control unit 100 controls operations of the respective blocks in the image sensor 1 by supplying operational clock signals and timing signals thereto.

A pixel section 110 includes a plurality of pixels arranged two-dimensionally, and a charge obtained by a photoelectric conversion element in each pixel carrying out a photoelectric conversion in accordance with an incident light amount is converted into a voltage and output. Each pixel is provided with a color filter and a microlens. A Bayer array cyclic structure using what is known as an RGB primary color filter including R (red), G (green), and B (blue) is typically used as the color filter, but the color filter is not necessarily limited thereto.

A vertical scanning circuit 120 carries out timing control for sequentially reading out pixel signals obtained from the pixels in the pixel section 110 in a single frame period. The readout is generally carried out sequentially by row, starting from the top row in the frame and moving down the rows.

A column amp group 130 is constituted of a plurality of column amps provided in respective columns, and is used to electrically amplify the pixel signals read out from the pixel section 110. A S/N ratio with noise produced by a ramp circuit 140, a column analog-digital converter group (column ADC group) 150, and so on in later stages is improved by amplifying the pixel signals using the column amp group 130. However, the column amp group 130 is not absolutely necessary in a circuit structure where the noise produced by the ramp circuit 140, the column ADC group 150, and so on is sufficiently low relative to the noise produced by the pixel section 110.

A fixed voltage circuit 400 supplies a fixed voltage to signal lines that connect the pixel section 110 and the column amp group 130. Although the fixed voltage circuit 400 is used in the first embodiment, a circuit that can be applied as a clip circuit or the like that clips signals at a given constant voltage may be used as well.

The ramp circuit 140 is a signal generator that generates a ramp-shaped voltage signal (ramp signal) having a constant slope in the time direction. The column ADC group 150 has a column ADC constituted of a comparison unit 151 and a counter/latch circuit 152 in each column. The comparison unit 151 compares the pixel signal (analog signal) amplified by the column amp group 130 with the ramp signal from the ramp circuit 140 and outputs a signal indicating a size relationship between the signals. Then, by the counter/latch circuit 152 latching a counter value in accordance with the signal from the comparison unit 151, an analog-digital conversion is carried out. Details of the operations carried out by the comparison unit 151 and the counter/latch circuit 152 will be given later. One row's worth of digital image data held by the counter/latch circuit 152 is read out in order from an end of the row by a horizontal transfer circuit 160.

The image data read out by the horizontal transfer circuit 160 is input into a signal processing circuit 170. The signal processing circuit 170 is a circuit that processes signals digitally, and can easily carry out gain computations by carrying out shift computations, multiplication, and so on in addition to adding an offset value of a set amount through digital processes. A pixel region that is shielded from light (an OB pixel section) may be formed in the pixel section 110, and the signal processing circuit 170 may carry out a digital black level clamping operation using signals obtained from the pixels in the OB pixel section. Furthermore, the signal processing circuit 170 controls the ramp signal output from the ramp circuit 140 through the timing control unit 100 on the basis of input image data, as will be described later.

The image data processed by the signal processing circuit 170 is passed to an external output circuit 180. The external output circuit 180 has a serializer function, and converts multi-bit input parallel signals from the signal processing circuit 170 into a serial signal. The serial signal is converted into an LVDS signal or the like, for example, and is output to the image processing section 2.

A controller circuit 300 is an I/F unit with the image processing section 2, and handles control of the image sensor 1 from the CPU of the image processing section 2 using a serial communication circuit or the like.

Next, the principles of a basic AD conversion using the column ADC group 150 of the image sensor 1 will be described using FIGS. 2A and 2B. As described above, the column ADC group 150 has the comparison unit 151 and the counter/latch circuit 152 in each column. Meanwhile, as illustrated in FIG. 2A, the comparison unit 151 compares a pixel signal VAMP output from the column amp group 130 with a ramp signal VRAMP output from the ramp circuit 140, and outputs a result of the comparison.

Figure 2B:
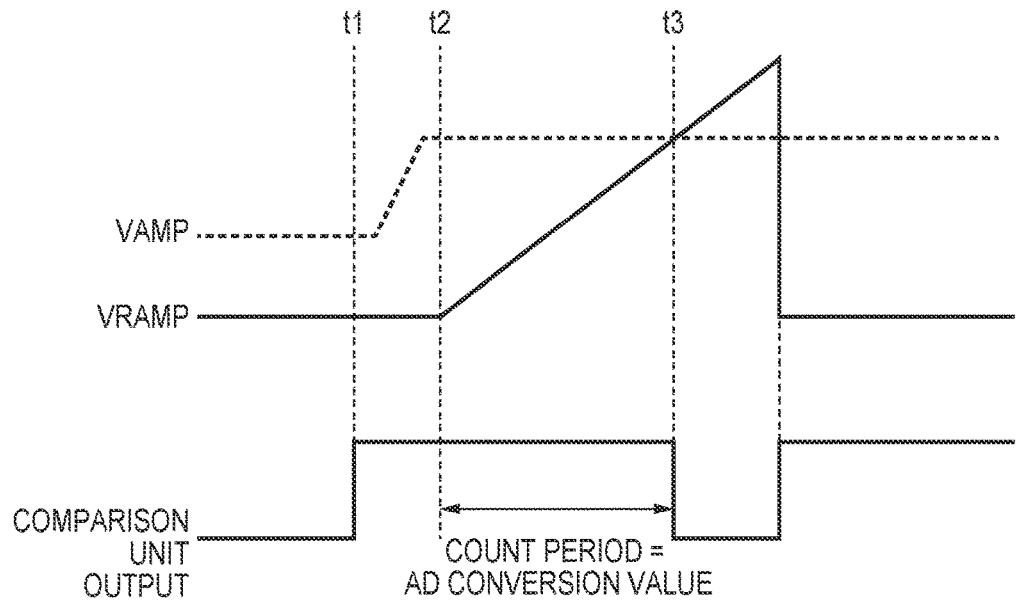

As indicated in FIG. 2B, the operations performed by the comparison unit 151 start before the start of the readout of the pixel signal VAMP from the pixel section 110 (time t1). When the operations of each column amp of the column amp group 130 stabilize, a count value of the counter/latch circuit 152 is reset at time t2. The signal level of the ramp signal VRAMP output from the ramp circuit 140 increases as time passes following time t2, in synchronization with the count reset timing of the counter/latch circuit 152. The output of the comparison unit 151 inverts when the signal level of the ramp signal VRAMP output from the ramp circuit 140 exceeds the signal level of the pixel signal VAMP output from the column amp group 130 (time t3). The counter/latch circuit 152 carries out counting operations during a period from when the count value is reset to when the output of the comparison unit 151 inverts (from time t2 to time t3). A count value proportional to the output level of the pixel signal amplified by the column amp group 130 is obtained through these operations, and thus the count value obtained in this manner serves as an AD conversion result. Note that the method for comparing the pixel signal and the ramp signal, the method of counting performed by the counter/latch circuit, and so on described here are merely examples, and other methods may be employed as long as the period from when the count value is reset to when the output of the comparison unit 151 inverts can be detected.

FIG. 3 is a diagram illustrating operations performed by the ramp circuit 140 and the column ADC group 150 according to the first embodiment. In FIG. 3, the abscissa represents time, the ordinate in the upper section of the graph represents an output level, and the lower section of the graph indicates the output of the comparison unit 151. An example in which the slope of the ramp signal VRAMP output from the ramp circuit 140 is changed in accordance with the signal level of the pixel signal VAMP from the column amp group 130 will be described with reference to FIG. 3.

Generally, in a process that reads out a signal from a unit pixel, an N signal (noise level) is first read out and AD-converted and an S signal (noise level+signal level) is then read out and AD-converted. A signal with good S/N is then obtained by finding a difference between the S signal and the N signal converted by the signal processing circuit 170 and eliminating the noise component.

First, to AD-convert the N signal, the operations of the comparison unit 151 are started at time t11, the count of the counter/latch circuit 152 is reset at time t12, and the signal level of the ramp signal VRAMP output from the ramp circuit 140 is changed. Here, the signal level of the N signal, which is the noise level, is low, and thus a first ramp signal VRAMP (gentle slope), which has a low slope, is used in the AD conversion of the N signal. The N signal is AD-converted by carrying out counting operations during a period from when the count of the counter/latch circuit 152 is reset to when the output of the comparison unit 151 inverts (from time t12 to time t13).

Next, in a level determination period, the ramp circuit 140 outputs, to the comparison unit 151, a determination ramp signal whose maximum level is a set determination level Vs, relative to the S signal, which is an output signal obtained by reading out a signal corresponding to a charge accumulated in the pixel section 110 and amplifying the signal using the column amp group 130. This is then compared with the S signal. Here, at time t14, the count value of the counter/latch circuit 152 is reset and the ramp circuit 140 starts outputting the determination ramp signal having the predetermined determination level Vs as the maximum level. If the signal level of the S signal is greater than or equal to the determination level Vs (S≥Vs), the output of the comparison unit 151 does not invert, and thus the count value continues to increase until the level determination period ends at time t16. As opposed to this, if the signal level of the S signal is lower than the determination level Vs (S<Vs), the output of the comparison unit 151 inverts at time t15, for example, and thus the count value stops increasing. In this manner, the signal processing circuit 170 can determine whether the signal level of the S signal is higher or lower than the determination level Vs from the count value of the counter/latch circuit 152. Note that the timing at which the count value of the counter/latch circuit 152 is reset may be taken as the point in time when the output of the ramp circuit 140 stabilizes at the determination level Vs and the count value may be controlled to 0 in the case where the signal level of the S signal is lower than the determination level Vs (S<Vs).

In the case where the signal level of the S signal is lower than the determination level Vs, the S signal is AD-converted using the same first ramp signal VRAMP (gentle slope) as the N signal from time t17. As a result, a count value between time t17 and time t18 is obtained, in the example indicated in FIG. 3. On the other hand, in the case where the signal level of the S signal is greater than or equal to the determination level Vs, the S signal is AD-converted using a second ramp signal VRAMP (steep slope) whose slope is α times that of the first ramp signal VRAMP (gentle slope). As a result, a count value between time t17 and time t19 is obtained, in the example indicated in FIG. 3.

Figure 4A:
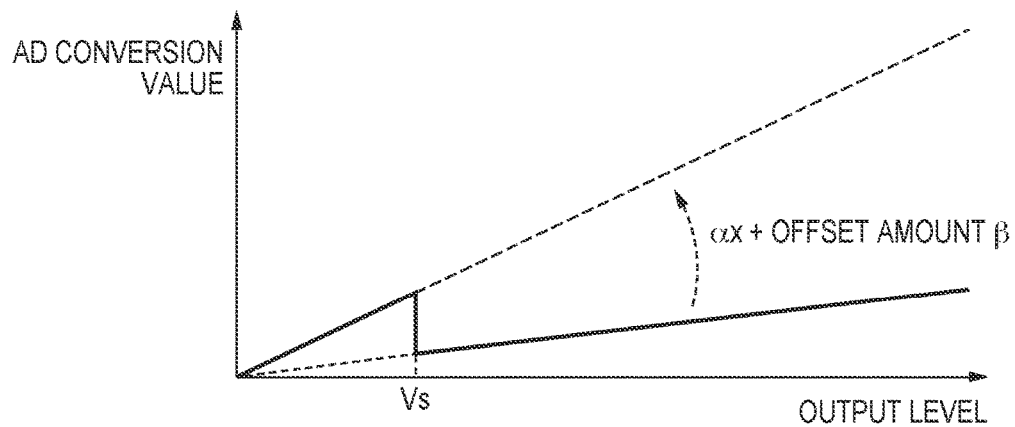
FIGS. 4A and 4B are diagrams illustrating a relationship between an output level and an AD conversion result in the case of using ramp signals having different slopes depending on a signal level.
Figure 4B:
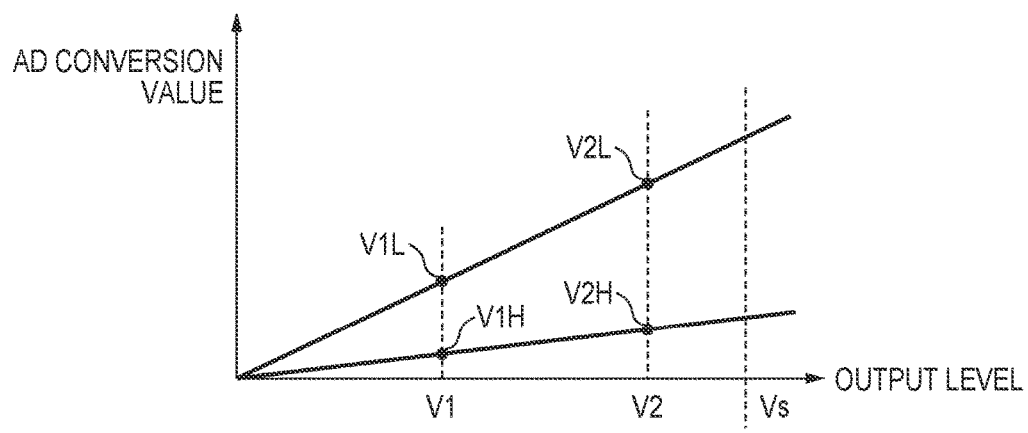

FIGS. 4A and 4B are diagrams illustrating a relationship between the signal level of an output signal and an AD conversion result in the case of using ramp signals having different slopes depending on an output level. In FIGS. 4A and 4B, the abscissa represents an output signal level of the column amp group 130, and the ordinate represents a digital value obtained by AD-converting the S signal. The solid line represents the digital value (AD-converted value) AD-converted by the comparison unit 151 and the counter/latch circuit 152, and input into the signal processing circuit 170 through the horizontal transfer circuit 160. As described above, an S signal whose signal level is lower than the determination level Vs is AD-converted using the first ramp signal VRAMP (gentle slope), whereas an S signal whose signal level is greater than or equal to the determination level Vs is AD-converted using the second ramp signal VRAMP (steep slope). Accordingly, as illustrated in FIG. 4A, the post-AD conversion S signal does not coincide before and after the determination level Vs.

Accordingly, first, the signal processing circuit 170 multiplies the AD conversion value of the S signal whose signal level is higher than the determination level Vs by a ratio α between the slopes of the first ramp signal VRAMP (gentle slope) and the second ramp signal VRAMP (steep slope). Furthermore, the signal level of the pixel signal corresponding to the incident light amount and the AD conversion value are corrected to a primary relationship by adding an offset amount β to the determination level Vs in order to eliminate a gap.

If a video from effective pixels is output in a state where the aforementioned correction is not carried out, an unnatural video in which gaps remain at a given brightness will result. An ideal target correction value changes depending on the temperature of the image sensor, the driving timing of the image sensor (the gain, operation state, and so on of the column amp group 130), and driving settings (power source settings and the like), and thus it is necessary to re-obtain the correction value used in the correction when these conditions have changed.

Meanwhile, it is necessary to reduce to the greatest extent possible sudden changes in the correction value occurring when power is turned on and immediately after the driving method of the image sensor 1 is switched, temporary fluctuations in the correction value caused by noise in the power source supplied to the column amp group 130, interconnect noise, and external noise, and so on. "External noise" includes magnetic noise produced by motor driving or the like jumping in, for example. Details of a method for reducing correction value fluctuations will be given later.

Next, an example of a process for calculating the ratio α between the slopes of the first ramp signal VRAMP (gentle slope) and the second ramp signal VRAMP (steep slope), and the offset amount β, will be described.

Figure 5:
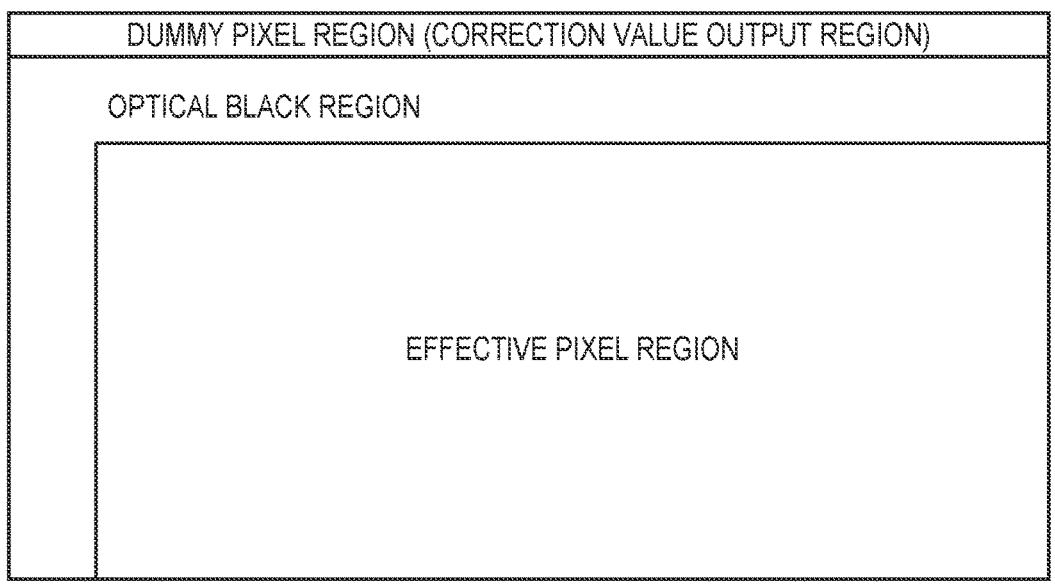
FIG. 5 is a diagram illustrating an example of the configuration of a pixel section of the image sensor according to an embodiment.

FIG. 5 illustrates an example of the configuration of the pixel section 110. In this pixel configuration, a dummy pixel region lacking photodiodes is provided in the uppermost area, and an optical black (OB) region that is shielded from light and an effective pixel region that output signals obtained through photoelectric conversion are arranged in that order therebelow. In the first embodiment, the dummy pixels are used for calculating the ratio α between the slopes and the offset amount β. Here, control is carried out so that the fixed voltage from the fixed voltage circuit 400 is input in a pixel signal readout period for the dummy pixels, and the voltage input into the comparison unit 151 from the column amp group 130 reaches a given fixed voltage. Note that the voltages V1 and V2, which are lower than the determination level Vs, are used as the fixed voltage in the first embodiment.

Figure 6A:
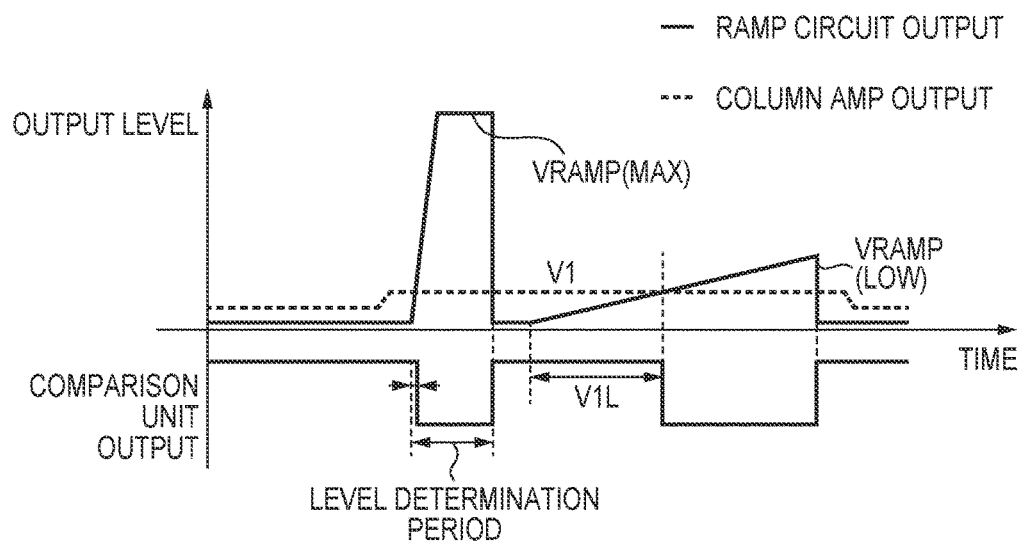
FIG. 6A is a timing chart for a case where a fixed voltage V1 is AD-converted using a first ramp signal VRAMP (gentle slope) in a dummy pixel readout period according to an embodiment.

An AD conversion process carried out in the dummy pixel readout period will be described with reference to FIGS. 6A to 6D. In FIG. 6A, the fixed voltage V1 is AD-converted. Note that unlike the process described with reference to FIG. 3, it is not necessary to provide a period for AD-converting the N signal. As illustrated in FIG. 6A, the fixed voltage V1 is AD-converted using the first ramp signal VRAMP (gentle slope), whose slope is low, by raising the ramp signal VRAMP output from the ramp circuit 140 during the level determination period to a maximum value VRAMP(MAX). The result of the AD conversion is represented by V1L.

Figure 6B:
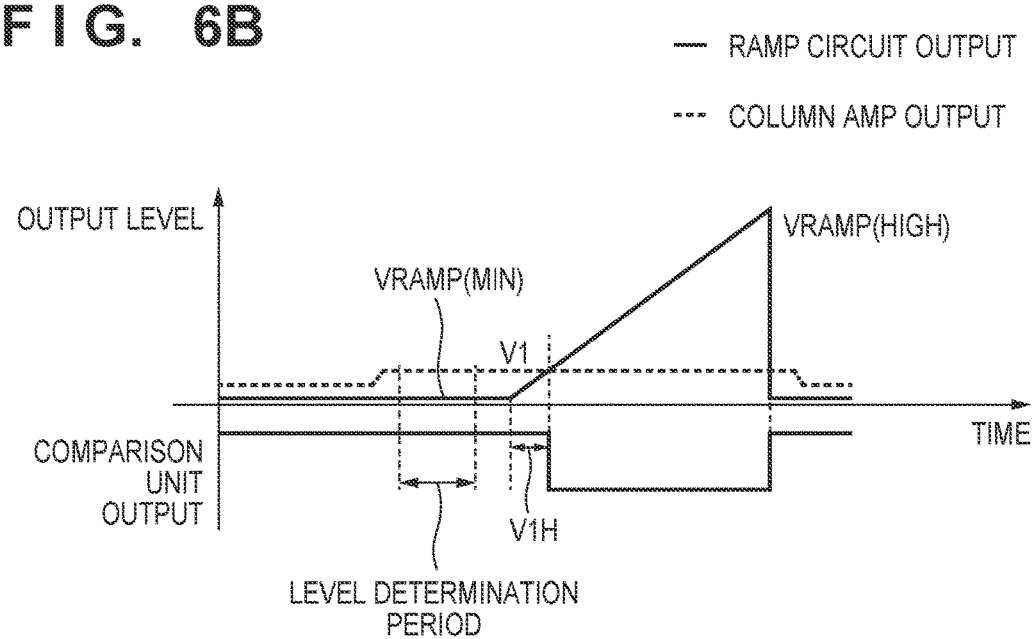
FIG. 6B is a timing chart for a case where the fixed voltage V1 is AD-converted using a second ramp signal VRAMP (steep slope) in a dummy pixel readout period according to an embodiment.

Next, as illustrated in FIG. 6B, the fixed voltage V1 is AD-converted using the second ramp signal VRAMP (steep slope), whose slope is high, by setting the ramp signal VRAMP output from the ramp circuit 140 during the level determination period to a minimum value VRAMP(MIN). The result of the AD conversion is represented by V1H.

Figure 6C:
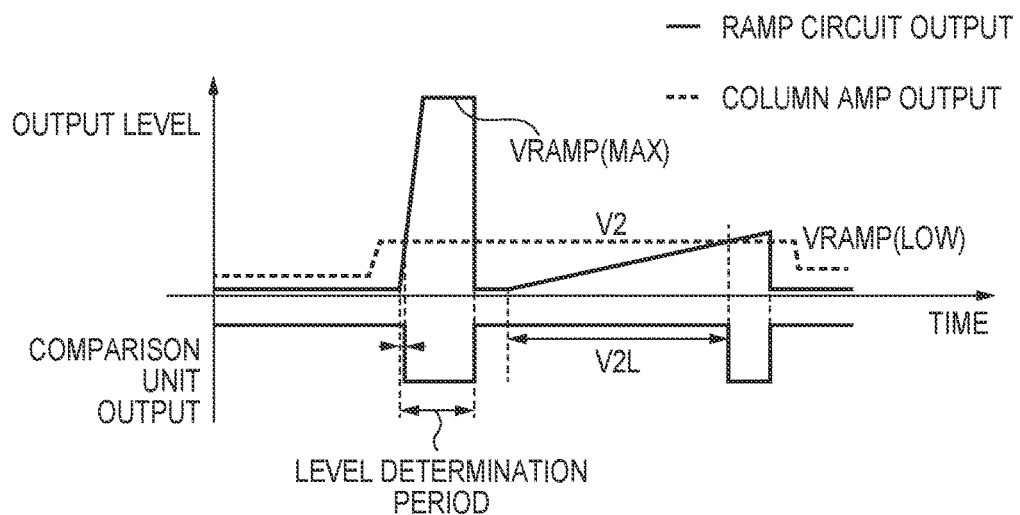
FIG. 6C is a timing chart for a case where a fixed voltage V2 is AD-converted using the first ramp signal VRAMP (gentle slope) in a dummy pixel readout period according to an embodiment.
Figure 6D:
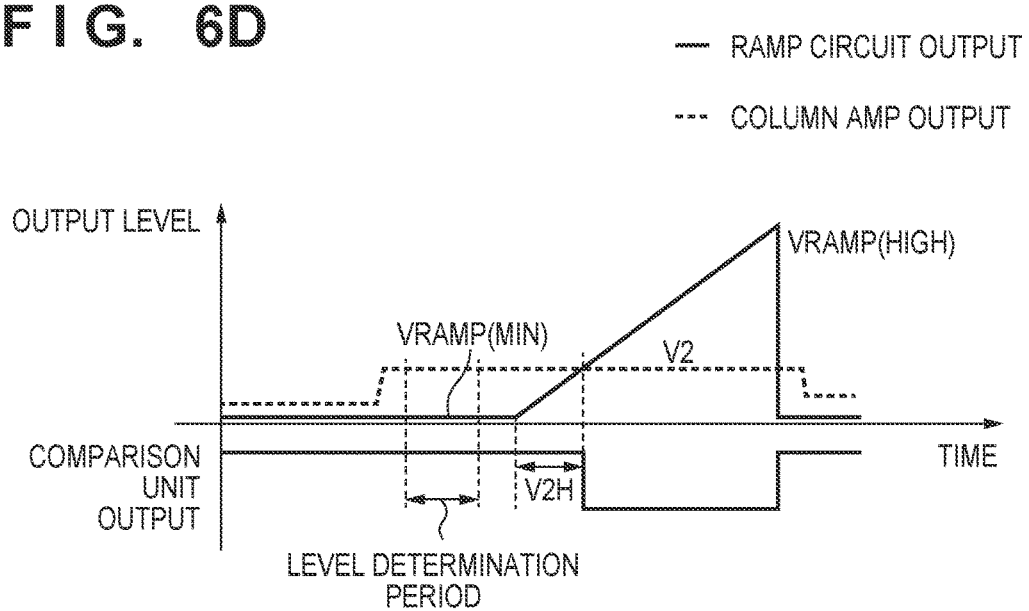
FIG. 6D is a timing chart for a case where the fixed voltage V2 is AD-converted using the second ramp signal VRAMP (steep slope) in a dummy pixel readout period according to an embodiment.

Thereafter, as illustrated in FIGS. 6C and 6D, the fixed voltage is changed to the voltage V2 that is higher than the voltage V1, and the same AD conversion as illustrated in FIGS. 6A and 6B is carried out. The results thereof are represented by V2L and V2H, respectively.

This is represented as illustrated in FIG. 4B, when the abscissa represents an output level and the ordinate represents the AD conversion value. FIG. 4B indicates, in an enlarged manner, the area of FIG. 4A where the output signal level is lower than the determination level Vs. The slope ratio α and the offset amount β can be found from the following Formula (1) and Formula (2), respectively, from these four coordinate points.

$$\alpha = (V2L - V1L)/(V2H - V1H) \quad (1)$$

$$\beta = (V2L - V1L)/(V2 - V1) \times Vs - \alpha(V2H - V1H)/(V2 - V1) \times Vs \quad (2)$$

The above calculation of the correction values α and β may be carried out within the image sensor 1, or may be carried out by the image processing section 2. Note that a plurality of each of V1L, V1H, V2L, and V2H are obtained when reading out the pixel signals from the dummy pixels in the dummy pixel region, and thus average values for each are used when finding the slope ratio α and offset amount β from Formula (1) and Formula (2).

Here, the descriptions will focus on the offset amount β calculated through Formula (2). Although the offset amount β is calculated through Formula (2) so that two straight lines intersect at the determination level Vs, large fluctuations may occur when power is turned on, immediately after switching the driving method of the image sensor 1, when external noise is produced, and so on, as described earlier. Such fluctuations cause a level gap to occur in the signal levels near the determination level Vs, resulting in an unnatural video. However, to suppress a degradation in image quality caused by the signal level gaps while improving tone accuracy in order to improve the S/N ratio and expand the dynamic range, it is necessary to reduce fluctuations in the offset amount β to a level at which level gaps are not visible in the image.

Figure 7:
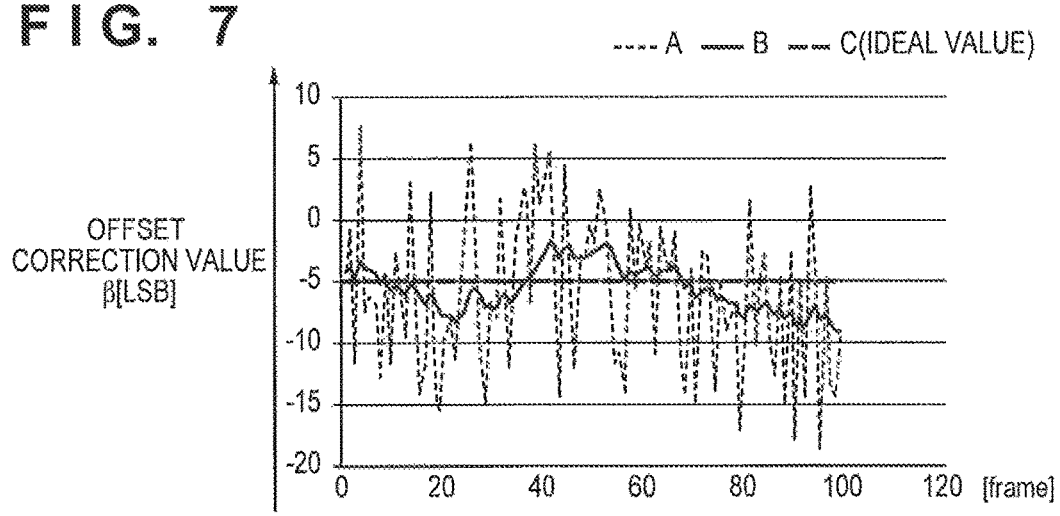
FIG. 7 is a diagram illustrating an example of fluctuations in an offset correction value β when noise is produced in a first embodiment.

FIG. 7 is a graph illustrating fluctuations in the offset correction value β when the offset correction value β is obtained on a frame-by-frame basis under conditions where noise that causes fluctuations in the offset amount (offset correction value) β is occurring. In FIG. 7, the abscissa represents a frame number (corresponding to time), the ordinate represents the offset correction value β, and changes in the offset correction value β from frame to frame are indicated by a graph A. Meanwhile, an ideal correction value in a state where there is no influence from noise (an ideal value) is indicated by a graph C. Although the ideal value does not fluctuate due to noise components or the like, the ideal value does change due to driving settings of the image sensor, temperature changes in the image sensor, and so on. In the first embodiment, it is assumed that the driving settings of the image sensor are consistent and the temperature is sufficiently stable.

In the first embodiment, it is assumed, for descriptive purposes, that the value of the offset correction value β being a consistent −5 LSB from frame 1 to frame 100 is ideal, as indicated by graph C. It is furthermore assumed that signal level gaps begin to appear in the image when the value of graph A exceeds ±5 LSB (less than or equal to −10 LSB or greater than or equal to 0 LSB) relative to the value of graph C, which is the ideal value.

In the example illustrated in FIG. 7, there are many frames where the value of the graph A exceeds the value of the graph C, which is the ideal value, by ±5 LSB. In other words, a video in which a gap is visible in a given frame but disappears in the next frame is repeated any number of times. Here, a method for reducing fluctuations in the offset correction value β will be described in detail.

One method for reducing fluctuations in the offset correction value β is a method that carries out a filtering process using the following Formula (3).

$$\beta f(n) = \beta(n) \times p + \beta f(n-1) \times (1-p) \quad (0 \leq p \leq 1) \quad (3)$$

In Formula (3), βf(n) represents the offset correction value in an nth frame after the filtering process. Meanwhile, a new offset correction value calculated on the basis of the aforementioned Formula (2) using an image obtained in the nth frame is defined as β(n), the offset correction value in an n−1th frame after the filtering process is defined as βf(n−1), and a cyclic coefficient is defined as p(0≤p≤1). The range that n can take on is n≥0, and is set so that in the case where n=0, β(n−1)=0 in a state where p is set to 1.0, due to the offset correction value βf(−1) of a previous frame not existing.

A graph B in FIG. 7 represents changes in the value of the post-filtering process offset correction value βf when the cyclic coefficient p is set to 0.1 in the aforementioned Formula (3). As can be seen from this graph, by carrying out the filtering process on the graph A, the value of the offset correction value βf falls within a range of ±5 LSB from the graph C, which corresponds to a limit value where signal level gaps begin to appear in the image.

Although the cyclic coefficient p is set to 0.1 in the example illustrated in FIG. 7, it is not absolutely necessary for p to be 0.1, and the cyclic coefficient may be determined in accordance with the magnitude of the fluctuations in the correction value caused by the noise. Furthermore, a program may be used for carrying out the filtering process, or a filtering process circuit may be added to the interior of the image sensor 1 or to the image processing section 2.

Using the slope ratio α and offset correction value βf obtained as described above as correction coefficients, a digital signal $S_D(n)$ of the S signal in the nth frame AD-converted using the second ramp signal VRAMP (steep slope) is corrected, and a corrected digital signal $S'_D(n)$ is obtained, through the following Formula (4).

$$S'_D(n) = S_D(n) \times \alpha + \beta f \quad (4)$$

As described above, a filtering process is carried out on the offset correction value β, calculated using the signal obtained by reading out the fixed voltage in the dummy pixel readout period. Through this, fluctuations in the offset correction value β, can be reduced below the limit value at which signal level gaps begin to appear in an image. This makes it possible to reduce image quality degradation caused by signal level gaps.

Several examples of favorable filtering process methods will be described below.

(1) When Offset Correction Value β has Sudden High Fluctuation

As described above, in the case where the correction value has fluctuated due to noise in the power source supplied to the column amp group 130, interconnect noise, external noise, or the like, the correction value can be stabilized by carrying out the filtering process with a reduced cyclic coefficient. However, if the value of the cyclic coefficient p is reduced too much, it will take time for the value of the offset correction value βf(n) to converge near the ideal value in the case where the ideal value (the target correction value) has changed suddenly due to a sudden change in temperature, a switch in the driving method of the image sensor, or the like. On the other hand, if the cyclic coefficient is increased, the effect of the filtering process on reducing fluctuations in the correction value will weaken, resulting in frames in which signal level gaps can be seen.

Accordingly, the cyclic coefficient p is set to 0 in the case where the newly-obtained offset correction value β(n) clearly fluctuates greatly relative to the post-filtering process offset correction value βf(n−1) of the previous frame. Through this, the cyclic coefficient p becomes a setting value that can sufficiently adapt to fluctuations in the ideal value, and sudden changes in the correction value β due to external noise or the like can also be suppressed, which makes it possible to reduce the influence of noise. External noise in particular can produce sudden extremely large level fluctuations, and there are thus cases where it is not possible to achieve both optimization of the amount of time in which the post-filtering process offset correction value βf(n) converges near the ideal value and stabilization of the offset correction value relative to the external noise or the like.

Figure 8A:
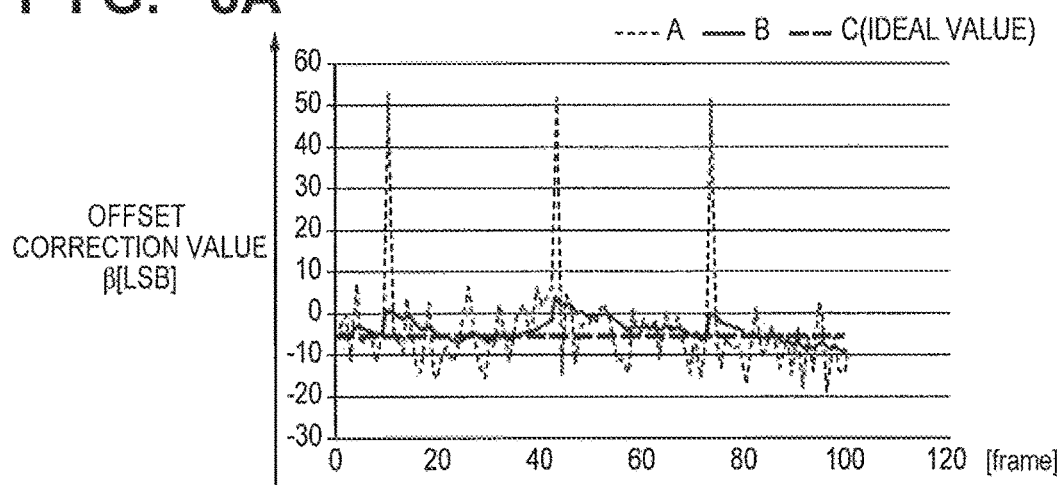
FIGS. 8A and 8B are diagrams for explaining an offset correction value filtering process carried out when external noise is occurring according to the first embodiment.

FIG. 8A is a graph illustrating fluctuations in the offset correction value β in the case where external noise has occurred. In the example illustrated in FIG. 8A, external noise is occurring in three frames as compared to the example illustrated in FIG. 7; however, the rest is the same as in FIG. 7, and thus detailed descriptions of FIG. 8A will be omitted.

In FIG. 8A, there are three frames (the 13th, 43rd, and 73rd frames) in which the value of graph A is approximately 60 LSB higher than the value of graph C, which represents the ideal value. Accordingly, as indicated by graph B, frames in which the post-processing result exceeds ±5 LSB from graph C, which represents the limit value, occur despite the filtering process having been carried out. In other words, frames in which gaps can be seen occur across only several frames among the 100 frames, and then video in which gaps cannot be seen are periodically repeated.

Accordingly, in the first embodiment, a difference between the newly-obtained offset correction value β(n) and the filtering process result βf(n−1) for the correction value used up to the previous frame is found before carrying out the filtering process using the aforementioned Formula (3). It is then determined whether or not that difference exceeds a threshold, and control is carried out to set the cyclic coefficient p to 0 in the case where the threshold is exceeded. Although the threshold is set to ±30 LSB in the first embodiment, it is preferable that the threshold be determined in accordance with the noise level when external noise is not occurring (a random fluctuation caused by the power source voltage, patterned interconnects, and so on) and the setting value for the cyclic coefficient. Ideally, it is preferable that the threshold be set so that the post-filtering process offset correction value βf(n) does not exceed the limit value at which signal level gaps begin to appear in the image even in the case where external noise has occurred.

Figure 8B:
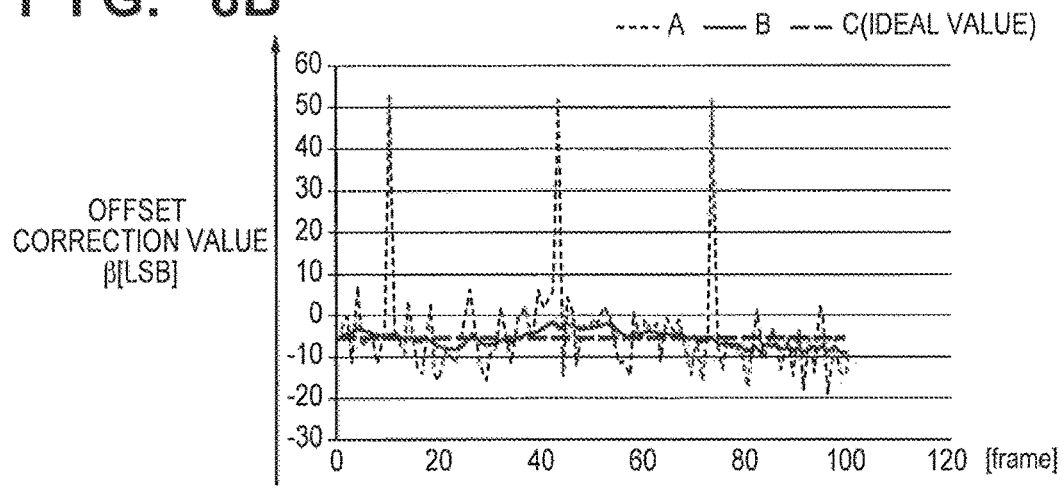

Graph B in FIG. 8B represents the filtering process result in the case where the threshold determination has been added. In FIG. 8B, the threshold is set to ±30 LSB, and in the three frames where external noise has occurred, the cyclic coefficient p is 0 and the post-filtering process correction value βf(n−1) from the previous frame is carried over. By adding this process, the post-filtering process offset correction value βf(n) stays within a range less than or equal to the limit value at which signal level gaps begin to appear, in all of the images.

As described above, a difference between the post-filtering process offset correction value βf(n−1) from the previous frame and the newly-obtained offset correction value β(n) is found before the filtering process is carried out. It is then determined whether or not that difference value exceeds a threshold, and the cyclic coefficient p is set to 0 in the case where the threshold is exceeded. Through this, the influence of the post-filtering process offset correction value βf(n) can be suppressed in the case where a sudden large fluctuation has occurred due to external noise or the like. Furthermore, both optimization of the amount of time in which the post-filtering process offset correction value βf(n) converges near the ideal value and stabilization of the correction value relative to the external noise or the like can be achieved.

Although the present embodiment describes external noise, the embodiment can also be applied in all cases where similar noise occurs.

(2) When Power is Turned on and when Image Sensor Driving Method is Switched

When power is turned on, the video signal output may be unstable, and the driving method of the image sensor 1 may be switched in order to carry out various types of processing at startup; as such, the ideal value may change greatly. Furthermore, even after power has been turned on, the ideal value undergoes sudden great changes immediately after the image sensor driving method is switched. These factors cause a difference between the post-filtering process offset correction value βf(n) and the ideal value to increase suddenly.

The amount of time required until the value converges near the ideal value can be minimized by not carrying out the filtering process. However, if the filtering process is not carried out, fluctuations in the correction value β(n) caused by power source noise or the like become unable to be reduced after the offset correction value βf(n) has converged near the ideal value.

Accordingly, in the present embodiment, a difference between the newly-obtained correction value β(n) and the post-filtering process offset correction value βf(n−1) from the previous frame is found before the filtering process is carried out, and the cyclic coefficient is changed in accordance with the magnitude of that difference value. Specifically, the cyclic coefficient is set higher in the case where the difference value is high and the cyclic coefficient is set lower in the case where the difference value is low. The cyclic coefficient may be determined for the difference value in accordance with the amount of change in the ideal value, the magnitude of fluctuations in the correction value caused by power source noise and so on, or the like.

Figures 9A, 9B:
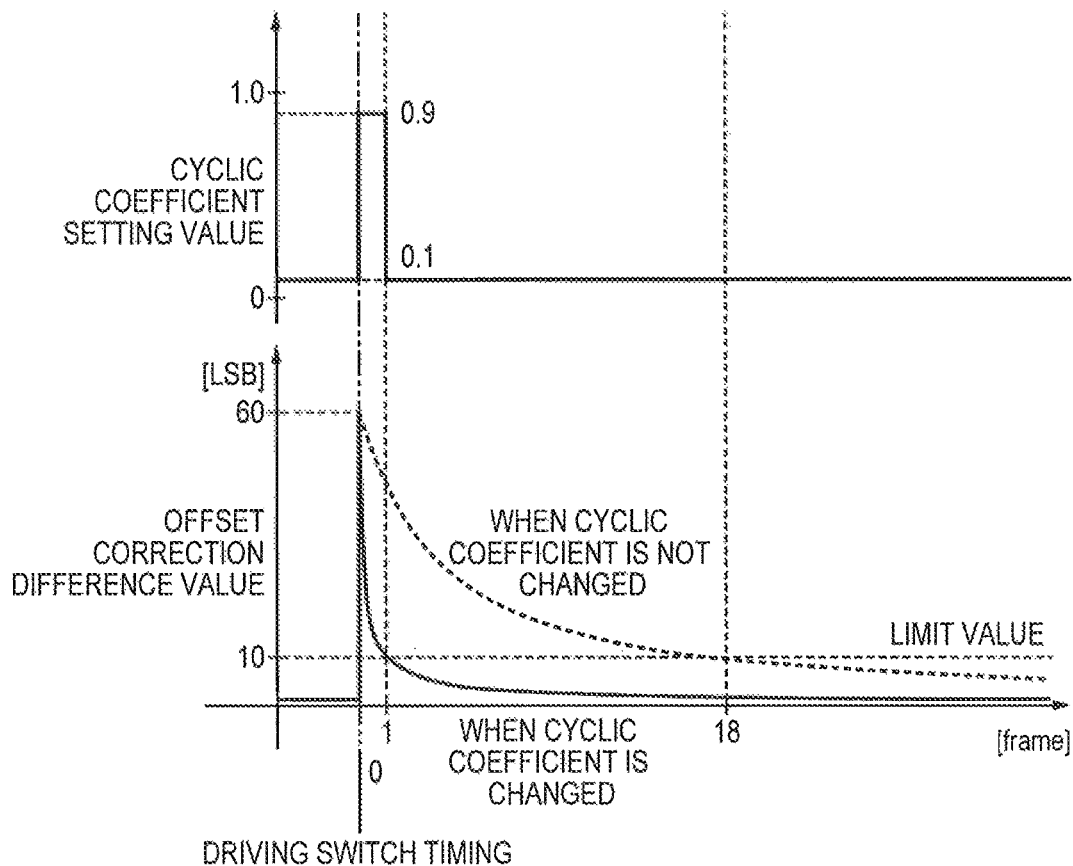
FIGS. 9A and 9B are diagrams for explaining cyclic coefficient setting values when power is turned on and when an image sensor driving method is switched according to the first embodiment.

In the present embodiment, table data indicated in FIG. 9A is provided in advance, and the cyclic coefficient p corresponding to the difference value between the newly-obtained offset correction value β(n) and the post-filtering process offset correction value βf(n−1) from the previous frame is determined by referring to that table data. Ideally (that is, in the case where the correction value does not change due to power source noise or the like), the difference values indicated in the table data of FIG. 9A are set to setting values at which the offset correction value converges at a value lower than the limit value at which signal level gaps begin to appear in the image within a single frame. Although the table data indicated in FIG. 9A only includes positive difference values, this is for descriptive purposes, and the same applies to negative difference values; strictly speaking, the values are absolute values $|\beta(n)-\beta f(n-1)|$.

FIG. 9B is a graph illustrating the setting value of the cyclic coefficient based on the table data in FIG. 9A and changes in the offset correction difference value $\beta(n)-\beta f(n-1)$ before and after the driving method of the image sensor 1 is switched. In FIG. 9B, the solid line represents a graph for the case where the setting value of the cyclic coefficient has been changed in accordance with the offset correction difference value, and the broken line represents a graph for the case where the setting value of the cyclic coefficient is not changed. 10 LSB, which is the limit value at which signal level gaps begin to appear in the image, is also provided as a reference.

In FIG. 9B, the offset correction difference value is near almost 0 LSB (strictly speaking, fluctuations caused by power source noise or the like are superimposed) before the driving method of the image sensor 1 is switched, and thus the cyclic coefficient p is set to 0.1. The cyclic coefficient p remains set to 0.1 during the period until the driving method of the image sensor 1 is switched.

Control carried out when the driving method of the image sensor 1 is switched will now be described. In the frame immediately following the switch (the first frame), an offset correction difference value of 60 LSB occurs, and thus the cyclic coefficient p is set to 0.9 on the basis of the table data illustrated in FIG. 9A. By doing so, a correction value near the ideal value can be obtained after the driving method switch, even in the frame immediately following the driving method switch. In the present embodiment, ideally (that is, in the case where the correction value does not change due to power source noise or the like), the correction value can be reduced to 10 LSB or less by changing the cyclic coefficient.

In the second frame after the driving method is switched, the offset correction difference value has become 10 LSB, and thus the cyclic coefficient p is set to 0.1 on the basis of the table data in FIG. 9A. The cyclic coefficient p is continuously set to 0.1 for the frames that follow thereafter in the case where the offset correction difference value is 10 LSB or less.

As opposed to this, in the case where the driving method is switched while the cyclic coefficient p remains set at 0.1, 18 frames are required to cause the offset correction difference value to converge on a value less than or equal to the limit value at which signal level gaps begin to appear in the image. However, by finding the offset correction difference value and changing the cyclic coefficient p in accordance with the magnitude thereof, the correction value becomes less than or equal to the limit value after one frame, and fluctuations in the correction value due to power source noise or the like can be reduced after converging near the ideal value.

As described above, when power is turned on and in the case where the image sensor driving method is switched, the difference between the offset correction values $\beta(n)$ and $\beta f(n-1)$ is found before carrying out the filtering process, and the cyclic coefficient is changed in accordance with the magnitude of that difference value. Through this, the convergence time of the offset correction value $\beta f(n)$ can be reduced even if the difference between the post-filtering process offset correction value $\beta f(n)$ and the ideal value has suddenly increased. Furthermore, fluctuations in the correction value caused by power source noise or the like can be reduced after the offset correction value $\beta f(n)$ has converged near the ideal value.

(3) When Temperature has Changed

A change in the temperature of the image sensor 1 is one cause of the ideal offset correction value changing. In particular, when the image sensor 1 begins to be driven after power is turned on, a sudden rise in temperature occurs due to power consumption starting in the image sensor 1; to suppress this rise in temperature, cooling may be carried out using a cooling device such as a fan or a Peltier element, which can cause a sudden drop in temperature. The ideal value of the offset correction value may change suddenly due to such sudden changes in temperature.

When the ideal value has changed suddenly in this manner, it may not be possible to adapt to the ideal value in the case where the cyclic coefficient is set to a lower value and the filtering process is carried out in order to suppress fluctuations in the offset correction value $\beta f(n)$ caused by power source voltage fluctuations, patterned interconnect noise, and so on, as described above.

Accordingly, in this embodiment, an inter-frame temperature change is detected from temperatures measured using a thermistor, a temperature detection sensor, or the like, and a process for changing the cyclic coefficient in accordance with a changing rate of the temperature is then carried out. Specifically, the cyclic coefficient is set higher in the case where the changing rate of the temperature is high, and the cyclic coefficient is set lower in the case where the changing rate of the temperature is low. Through this, the offset correction value $\beta f(n)$ can adapt to the ideal value even in the case where the ideal value has changed suddenly due to a sudden change in temperature, and fluctuations in the offset correction value $\beta(n)$ caused by power source noise or the like can be reduced in the case where there are no sudden changes in the ideal value.

Figure 10:
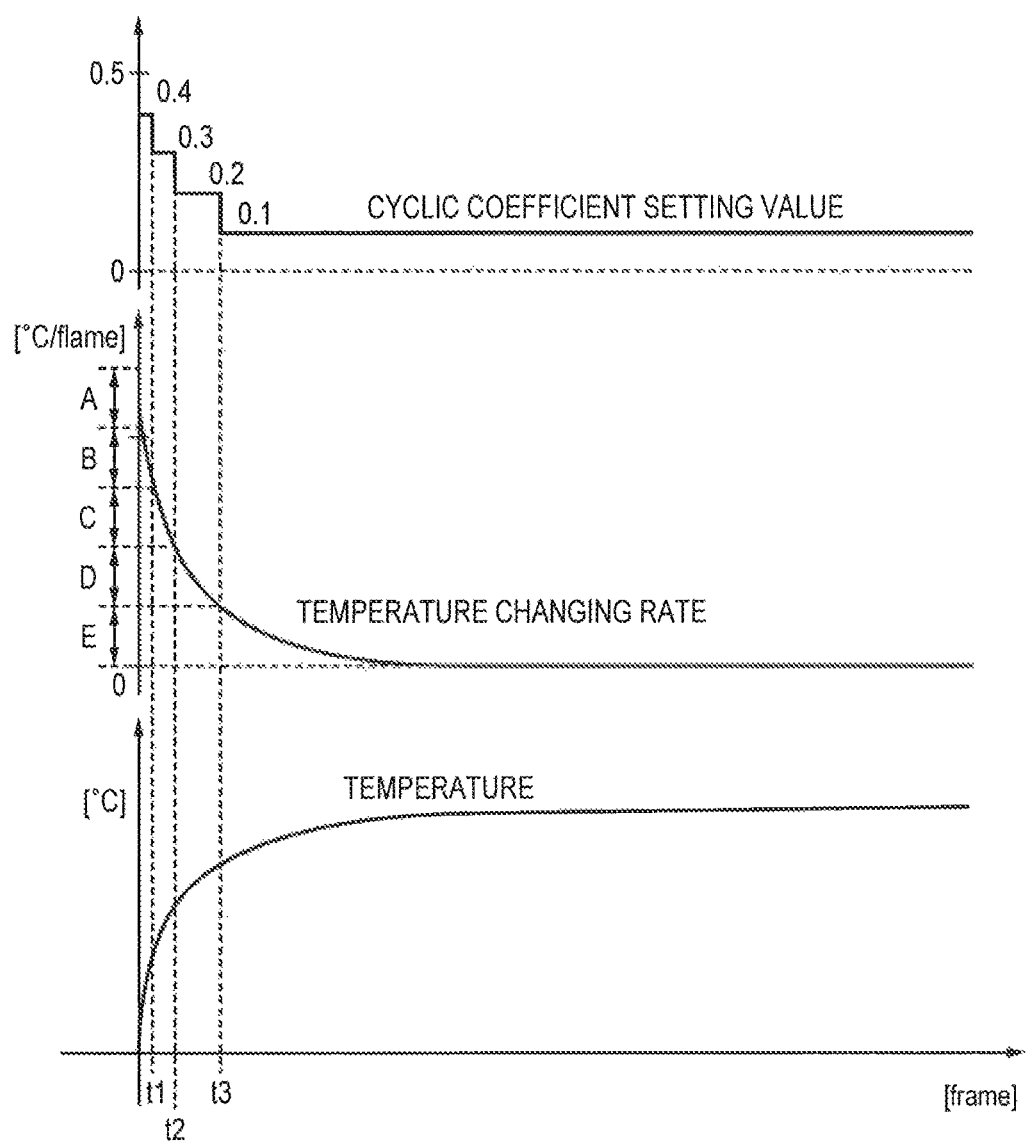
FIG. 10 is a diagram illustrating cyclic coefficient setting values relative to temperature changes according to an embodiment.

FIG. 10 is a conceptual diagram illustrating a temperature, a temperature changing rate, and the cyclic coefficient setting value relative to changes in time (frames). In FIG. 10, "temperature" indicates a temperature value obtained by a thermistor, a temperature detection sensor, or the like. The "temperature changing rate" indicates an amount by which the temperature has increased (a differential value of the temperature graph) per unit of time (per frame, in the present embodiment). In the present embodiment, regions A to E are provided in order from the highest temperature changing rate down, but when actual control is carried out, it is preferable to use a numerical value obtained by dividing the temperature change amount by the unit of time. The "cyclic coefficient setting value" indicates the setting value of the cyclic coefficient for the temperature changing rates A to E. In the present embodiment, the temperature changing rate A corresponds to 0.5; the temperature changing rate B, to 0.4; the temperature changing rate C, to 0.3; the temperature changing rate D, to 0.2; and the temperature changing rate E, to 0.1.

In FIG. 10, the temperature changing rate is in the region B during a period from immediately after startup to t1, and thus the cyclic coefficient setting value is set to 0.4. The temperature changing rate is in the region C during a period from t1 to t2, and thus the cyclic coefficient setting value is set to 0.3. The temperature changing rate is in the region D during a period from t2 to t3, and thus the cyclic coefficient setting value is set to 0.2. The temperature changing rate is in the region E from t3 on, and thus the cyclic coefficient setting value is set to 0.1.

In this manner, the cyclic coefficient is increased in the case where the changing rate of the temperature is high, and the cyclic coefficient is reduced in the case where the changing rate of the temperature is low. Through this, the post-filtering process offset correction value $\beta f(n)$ can be adapted to the ideal value even in the case where the ideal value has changed suddenly due to a sudden change in temperature. Meanwhile, in the case where the ideal value does not change suddenly, fluctuations in the offset correction value $\beta f(n)$ caused by power source noise or the like can be reduced.

Although the example illustrated in FIG. 10 indicates a case where the temperature rises, the same applies to cases where the temperature drops, and specifically, the cyclic coefficient setting value is set in accordance with an absolute value of the temperature changing rate.

(4) Subject Contrast

Figure 11A:
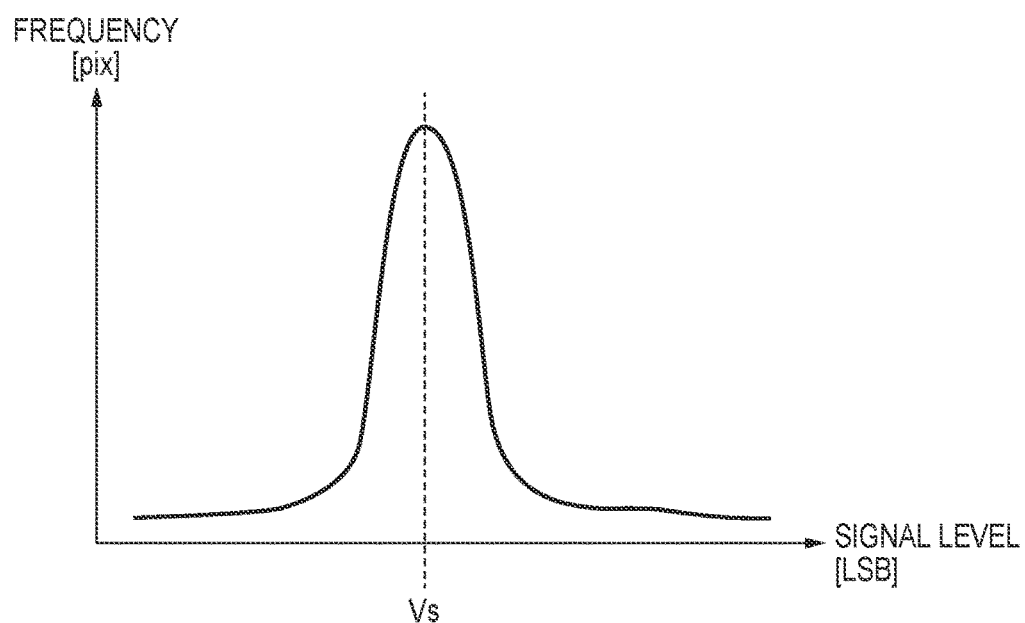
FIGS. 11A and 11B are diagrams illustrating examples of a brightness distribution in an image corresponding to a single frame according to an embodiment.
Figure 11B:
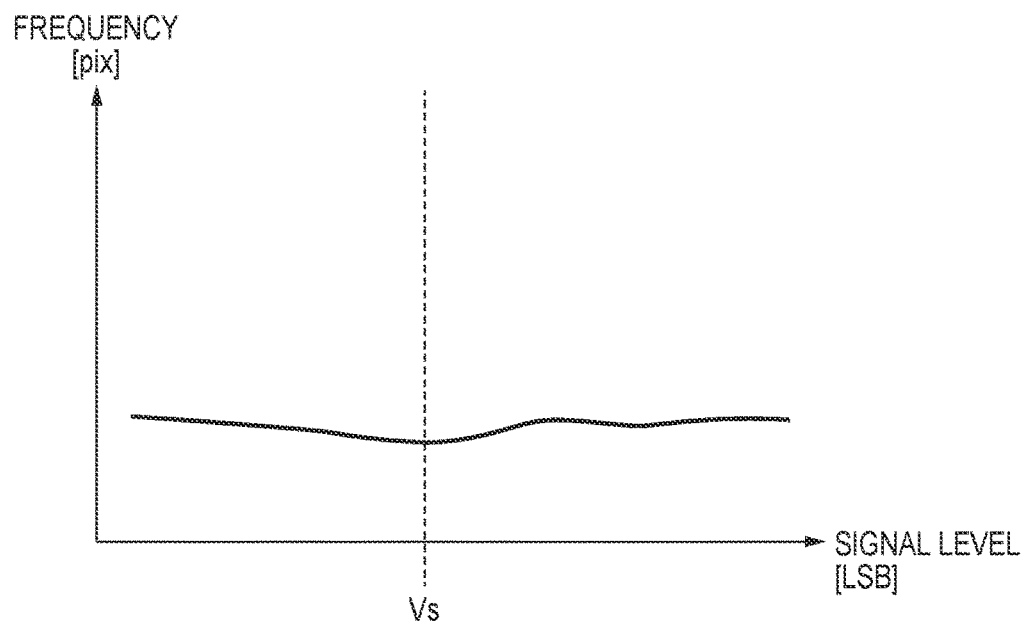

Although signal level gaps will appear in the image in the case where the offset correction value $\beta(n)$ has fluctuated, how noticeable the gaps are changes depending on the contrast and brightness of the subject. FIGS. 11A and 11B are histograms illustrating a brightness distribution of a single frame's worth of an image, where the abscissa represents a signal level and the ordinate represents the frequency (a number of pixels) of a brightness occurring within the image of the single frame. Meanwhile, the determination level Vs indicates a signal level at which the ramp signal is switched between the first ramp signal VRAMP (gentle slope) and the second ramp signal VRAMP (steep slope).

Many pixels having a brightness near the determination level Vs are present in an image that produces a histogram such as that illustrated in FIG. 11A. In other words, it is assumed that the subject is highly likely to be a subject having a low contrast, in which the brightness gradually changes central to a brightness level in the vicinity of the determination level Vs. Such an image can therefore be considered an image in which pixels having a brightness near the determination level Vs occur at a high frequency, and thus signal level gaps can be easily seen. It is preferable that the cyclic coefficient be set lower for such an image in order to stabilize the offset correction value $\beta f(n)$ to the greatest extent possible.

On the other hand, there are not so many pixels near the determination level Vs in an image that produces a histogram such as that illustrated in FIG. 11B. In other words, it is assumed that the subject has a high contrast and that a variety of brightnesses are present in a balanced manner throughout the entire image. Such an image can therefore be considered an image in which pixels having a brightness near the determination level Vs occur at a low frequency, and thus signal level gaps cannot be easily seen. It is not very necessary to stabilize the offset correction value $\beta f(n)$ for such an image, and thus it is preferable that the adaptability to the ideal value be improved by setting the cyclic coefficient to a higher value.

In the present embodiment, an optimal cyclic filter coefficient is determined in accordance with the histogram (brightness distribution). Specifically, pixels having a signal level near the determination level Vs are weighted, and a weighted accumulated value is calculated by accumulating the number of pixels that have been weighted, thus finding how many pixels are present near the determination level Vs. The cyclic coefficient setting value used in the filtering process is then determined in accordance with the weighted accumulated value.

Figure 12A:
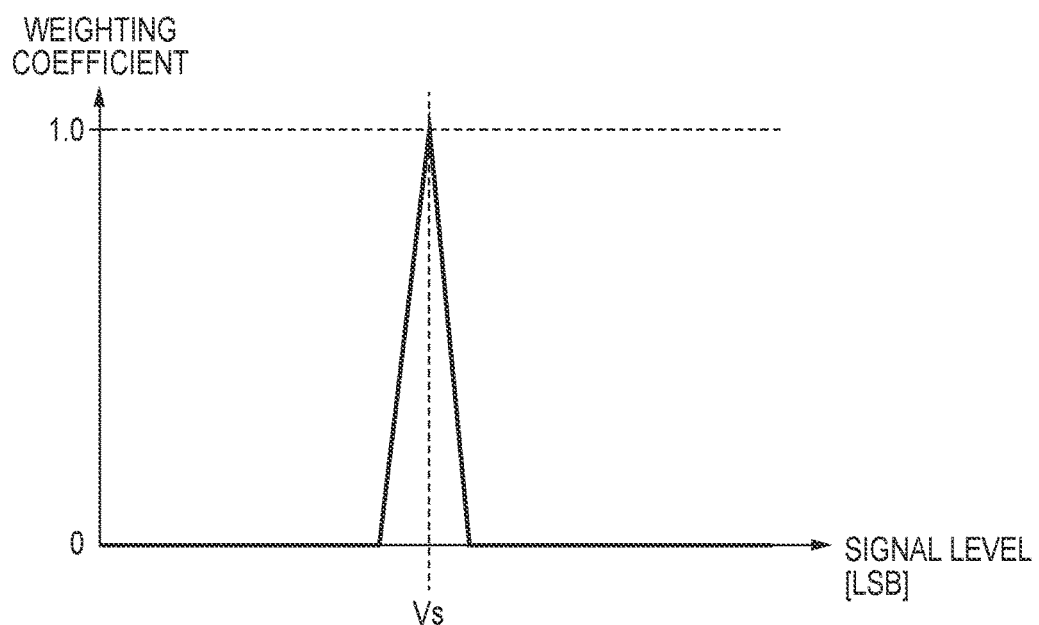
FIGS. 12A and 12B are diagrams illustrating a weighting coefficient and a cyclic coefficient in the case where the cyclic coefficient is determined in accordance with a contrast, according to an embodiment.

FIG. 12A illustrates an example of a weighting coefficient used in the weighting. The abscissa represents the signal level, whereas the ordinate represents the weighting coefficient. In FIG. 12A, the coefficient at the signal level corresponding to the determination level Vs is set to 1.0, and the weighting coefficient is reduced as the difference between the signal level and the determination level Vs increases. In the case where a difference between the signal level and the weighting coefficient of the determination level Vs is high to a certain extent, it is unlikely that signal level gaps will affect the image, and thus the weighting coefficient is set to 0. Note that the magnitude of fluctuations in the offset correction value $\beta(n)$ caused by power source noise or the like, which can occur near the level of the S signal, may be taken into consideration when determining the signal level at which to set the weighting coefficient to 0.

The weighted accumulated value is calculated by accumulating only the number of pixels that have been weighted through the aforementioned method. The cyclic coefficient setting value used in the filtering process is then determined in accordance with this calculated accumulated value.

Figure 12B:
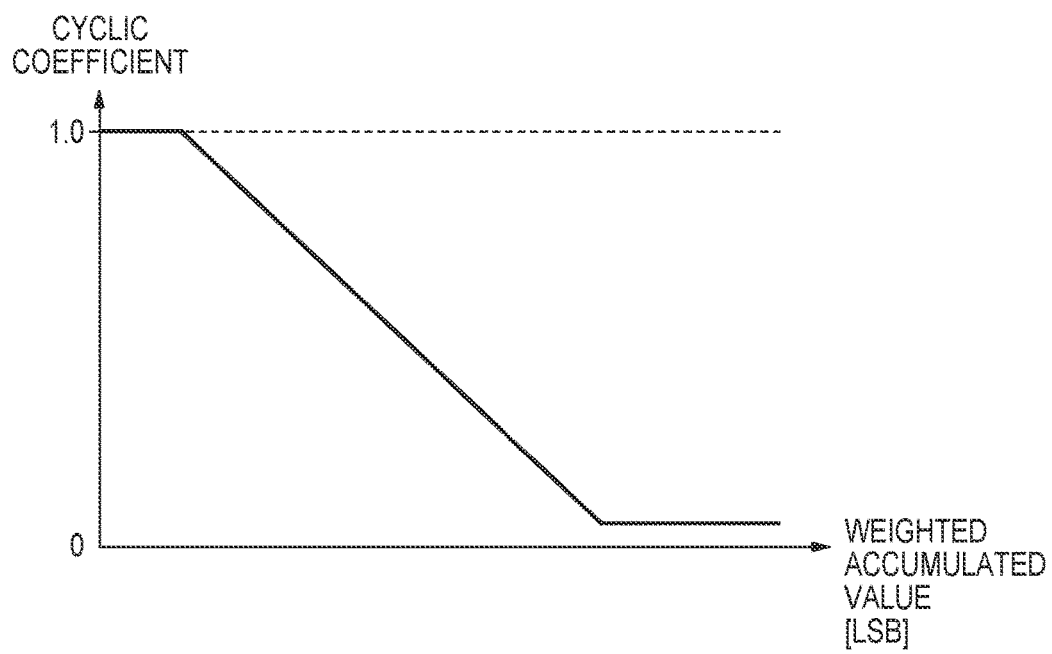

FIG. 12B is a conceptual diagram illustrating the cyclic coefficient setting value relative to the weighted accumulated value. The abscissa represents the weighted accumulated value, whereas the ordinate represents the cyclic coefficient setting value. As illustrated in FIG. 12B, the cyclic coefficient setting value decreases as the weighted accumulated value increases.

By carrying out the aforementioned processing, it can be determined whether or not signal level gaps can be easily seen for the subject, and the cyclic coefficient setting value is then changed in accordance with the result of the determination. Through this, the offset correction value $\beta f(n)$ can be stabilized and the adaptability to the ideal value can be optimized in accordance with the brightness distribution of the captured subject.

Although the present embodiment describes using a histogram for the image as a whole, the image may be divided into a plurality of regions and histograms may be created for each region. Doing so makes it possible to more accurately realize the aforementioned optimization even for subjects in which gaps occur easily in some regions within an image but do not occur easily in other regions.

As described above, pixels having a signal level near the determination level are weighted, a weighted accumulated value is calculated by accumulating the number of pixels that have been weighted, and the cyclic coefficient setting value is changed in accordance with that accumulated value result. Through this, the correction value can be stabilized and the adaptability to the ideal value can be optimized in accordance with the brightness distribution of the captured subject.

(5) Framerate

As described above, the ideal value changes in accordance with temperature changes. In order to ensure that the offset correction value $\beta f(n)$ adapts to that ideal value, it is necessary to obtain the offset correction value $\beta(n)$ frequently and update the offset correction value $\beta f(n)$.

However, when the framerate is low, the offset correction value $\beta(n)$ cannot be obtained frequently, and thus it is possible, depending on the framerate, that the offset correction value $\beta f(n)$ will adapt to changes in the ideal value in a delayed manner. In particular, it is necessary to set the cyclic coefficient lower in the case where there are great fluctuations in the offset correction value β(n) due to power source noise or the like, and thus the offset correction value βf(n) adapts to fluctuations in the ideal value caused by sudden temperature changes in a delayed manner. Accordingly, in the present embodiment, the cyclic coefficient setting value is changed in accordance with the framerate.

Figures 13, 14A, 14B:
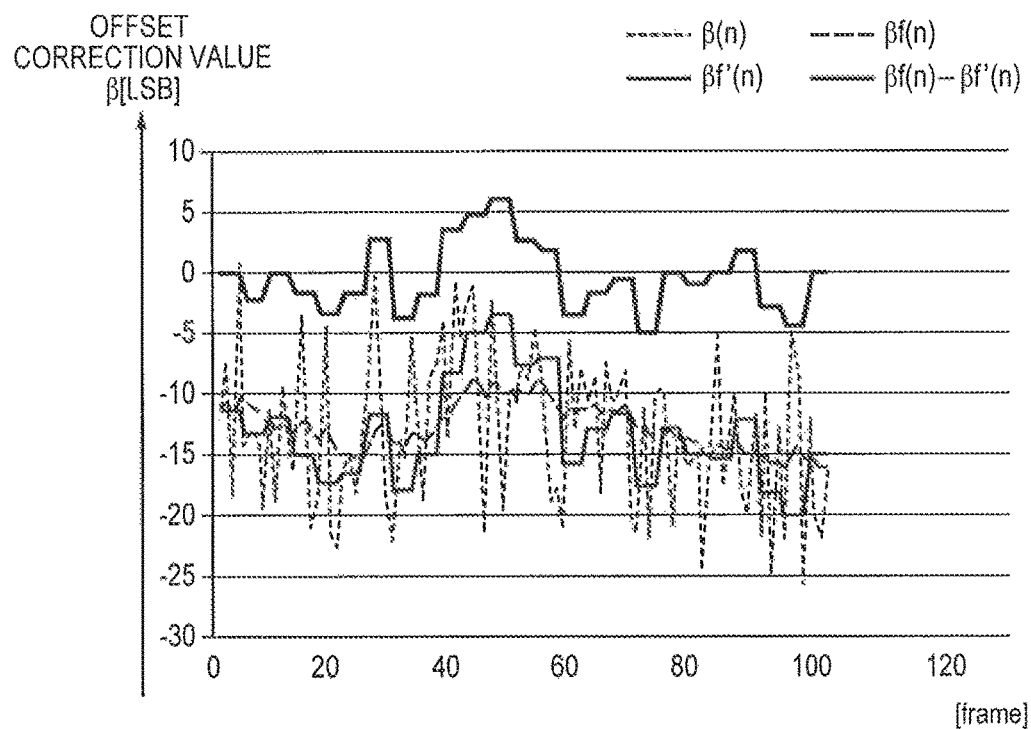
FIG. 13 is a diagram illustrating cyclic coefficients in the case where the cyclic coefficient is determined in accordance with a framerate, according to an embodiment.
FIGS. 14A and 14B are diagrams illustrating cyclic coefficient setting values in the case where the cyclic coefficient is changed in accordance with a stability level of the offset correction value, according to the first embodiment.

FIG. 13 illustrates setting values for the cyclic coefficient p for framerates. The setting value of the cyclic coefficient p increases as the framerate decreases, and the setting value of the cyclic coefficient p decreases as the framerate increases. In other words, the amount of influence the newly-obtained offset correction value β(n) has on the post-filtering process offset correction value βf(n) increases as the number of offset correction values β(n) that can be obtained per unit of time decreases. Accordingly, it is easier to adapt to fluctuations in the ideal value caused by temperature changes at lower framerates. A framerate range may be determined for each cyclic coefficient by taking into consideration the temperature changing rate and fluctuations in the offset correction value β(n) caused by power source noise or the like.

As described thus far, by changing the cyclic coefficient setting value in accordance with the framerate, the correction value can be adapted to fluctuations in the ideal value and the stabilization of the offset correction value can be optimized even at low framerates, where the correction value is updated less frequently.

(6) Frames not Used for Video

A case where the cyclic coefficient is changed in accordance with the framerate has been described above, but depending on the processing performed by the image sensor 1, there are cases where an image is read out from the image sensor 1 but is not actually used as an output image. For example, assume that images are read out from the image sensor 1 at 120 fps, and a video is output at 30 fps. In this case, of four frames' worth of images, only one image will be used for the actual image.

As described earlier, obtaining the offset correction value as frequently as possible makes it possible to ensure that the correction value in the filtering process is stabilized, and thus the correction value β(n) is also calculated for the images of frames not used in the video output and is used in the filtering process. Specifically, a difference is found between a result of carrying out the filtering process using only the offset correction value β(n) of the frames used for the video output, and a result of carrying out the filtering process using the offset correction value β(n) of the frames not used in the video output in addition to the correction values β(n) of the frames used for the video output. Through this, a stability level of the offset correction value β(n) is determined. It is determined that the correction value is not stable when the stated difference is high, and is determined that the correction value is stable when the stated difference is low.

In the case where the determination result indicates that the stability level is high, there is little fluctuation in the correction value due to power source noise or the like, and thus the cyclic coefficient is set higher in order to accelerate the adaptability. On the other hand, in the case where the stability level is low, there is a large amount of fluctuation in the offset correction value due to power source noise or the like, and thus the cyclic coefficient is set lower.

In the present embodiment, the offset correction value used when carrying out the filtering process using only the frames output as video is represented by βf(n), and the offset correction value used when carrying out the filtering process also using the frames not output as video is represented by βf'(n). βf(n)−βf'(n) is then calculated to determine the stability level.

FIG. 14A is a graph indicating the offset correction value β(n), the offset correction value βf(n) used when carrying out the filtering process using only the images output as video, the offset correction value βf'(n) used when carrying out the filtering process also using the images not output as video, and βf(n)−βf'(n) representing the stability level, relative to changes over time (frames).

In FIG. 14A, the abscissa represents time (when expressed as frames, a period of 1 to 100 frames), whereas the ordinate represents the offset correction values β(n), βf(n), βf'(n), and the offset correction difference value βf(n)−βf'(n). In the present embodiment, the cyclic coefficient is set higher for the offset correction value βf(n) used when carrying out the filtering process using only the images output as video. On the other hand, the cyclic coefficient is set to a minimum for the offset correction value βf'(n) used when carrying out the filtering process also using the images not output as video, in order to obtain as stable a correction value as possible (to serve as a reference for determining the stability level). The greater the difference value βf(n)−βf'(n) is at this time, the less stable βf (n) is.

In the present embodiment, values of a multiplication value q, which is based on the magnitude of the difference value βf(n)−βf'(n) and is used for multiplication with the cyclic coefficient p, are held as table data as illustrated in FIG. 14B, and a process for multiplying the cyclic coefficient p by the multiplication value q is carried out on the basis of this table data. By doing so, the cyclic coefficient can be optimized in the case where the cyclic coefficient used to calculate the offset correction value βf(n) when carrying out the filtering process using only the images output as video is not suitable in terms of the stability level. Although the table data indicated in FIG. 14B only includes positive difference values, this is for descriptive purposes, and the same applies to negative difference values; strictly speaking, the values are absolute values |βf(n)−βf'(n)|.

As described thus far, a difference is found between a result of carrying out the filtering process using only the correction value β(n) of the frames used for the video output, and a result of carrying out the filtering process using the correction value β(n) of the frames not used in the video output in addition to the correction value β(n) of the frames used for the video output. Then, by finding the stability level of the correction value of the frames used in the video output and changing the cyclic coefficient in accordance with the stability level, the cyclic coefficient can be optimized.

(7) Subject Movement

The way in which level gaps caused by fluctuations in the correction value β(n) caused by the power source noise or the like appear changes depending on the subject. In particular, in moving pictures, such gaps are easy to see in states where there is no subject movement; however, when the subject is moving, the signal levels of the pixels are constantly changing, and thus the gaps are less noticeable.

Accordingly, in the present embodiment, a process for determining the cyclic coefficient in accordance with a movement amount of the subject is carried out. A generally-used method of employing a gyrosensor, a method that detects the movement amount by calculating a motion vector from an obtained image, and so on can be used to detect the movement amount. It is assumed that a known technique is used to detect the movement amount of the subject, and thus detailed descriptions thereof will be omitted here.

FIG. 15 illustrates table data indicating the multiplication value q multiplied with the cyclic coefficient, corresponding to movement amounts of the subject. In the present embodiment, a case where there is a low movement amount for the subject is taken as a reference (1.0×), and processing is carried out so that the cyclic coefficient is increased as the movement amount of the subject increases so that the offset correction value βf(n) can be adapted to the ideal value with ease. Although the multiplication value q is set to 4.0× when there is a high movement amount for the subject in the present embodiment, the multiplication result is assumed to be 1.0 in the case where the product of the cyclic coefficient p and the multiplication value q is greater than 1.0. Although FIG. 15 indicates the movement amounts as "high", "medium", and "low", the movement amounts may be divided into ranges as appropriate for the method of detecting the movement amount.

By doing so, the offset correction value βf(n) can easily adapt to the ideal value under conditions where signal level gaps are not easy to see with respect to the subject, and fluctuations in the offset correction value βf(n) can be reduced under conditions where the gaps are easy to see with respect to the subject. Through this, the adaptability of the offset correction value βf(n) to the ideal value and the effect of reducing fluctuations in the offset correction value caused by power source noise or the like can be optimized.

As described thus far, by detecting a movement amount of the subject and changing the cyclic coefficient in accordance with the detected movement amount, the adaptability of the offset correction value βf(n) to the ideal value in accordance with the subject and the effect of reducing fluctuations in the correction value caused by power source noise or the like can be optimized.

(8) Spectral Properties of Color Filter

As described earlier, a color filter used in an image sensor typically has a Bayer array cyclic structure using three primary color filters, namely R, G, and B. Of the pixel signals output from the pixels having the stated R, G, and B three-color color filter, humans have vision characteristics that are extremely sensitive to G pixels but are less sensitive to R and B pixels than to G pixels. In other words, signal level gaps are more noticeable for G pixels, and are less noticeable for R and B pixels than for G pixels. Thus differences occur in the way in which level gaps are visually perceived (the limit value); as an example, signal level gaps begin to be noticeable for G pixels when ±10 LSB is exceeded, whereas such gaps are not noticeable until ±20 LSB for R and B pixels.

Accordingly, in the present embodiment, different cyclic coefficients are set for the R, G, and B pixels by taking the G pixel as a reference (1.0) and multiplying the cyclic coefficients p for the R pixels and the B pixels by the multiplication value q. Specifically, by setting the multiplication value q for the R and B pixels to values greater than 1.0, which is the value for G pixels, a state where fluctuations in the offset correction value βf(n) are below the limit value at which signal level gaps begin to appear in the image can be maintained while accelerating the adaptation to the ideal value. The offset correction value β(n) changes suddenly when power is turned on, when the image sensor driving method is switched, and so on in particular, and such sudden changes appear as signal level gaps even in the R and B pixels, which have low sensitivities to such sudden changes. In other words, it is preferable to set a cyclic coefficient that accelerates the adaption to the ideal value to the greatest extent possible while also ensuring that the correction value stays below the limit value at which signal level gaps begin to appear in the image (±20 LSB) as the cyclic coefficient for the R and B pixels.

FIG. 16 illustrates multiplication values q to be multiplied with the cyclic coefficient, for each of the color filter colors. The G pixel serves as a reference, and thus the multiplication value q for G pixels is set to 1.0×. In the present embodiment, the multiplication value q is set to 2.0× for the R pixels and the B pixels. Although the multiplication value q is set to 2.0× for the R and B pixels in the present embodiment, the multiplication result is assumed to be 1.0 in the case where the product of the cyclic coefficient p and the multiplication value q is greater than 1.0.

By doing so, the offset correction value βf(n) can be caused to quickly adapt even to sudden changes in the ideal value while keeping fluctuations in the offset correction value βf(n) below the limit value at which signal level gaps begin to appear in the image.

As described above, different cyclic coefficients are set for the R pixels, the G pixels, and the B pixels, and the cyclic coefficient is optimized for each pixel. Through this, the offset correction value βf(n) can be caused to quickly adapt even to sudden changes in the ideal value while keeping fluctuations in the offset correction value βf(n) below the limit value at which signal level gaps begin to appear in the image, for each pixel color.

(9) Changing Determination Level in Accordance with Gain Switch in Column Amp Group 130

In low-light situations, the gain of the column amp group 130 of the image sensor 1 may be switched in order to improve the S/N ratio of the image signal. A noise component arising in the circuits subsequent to the column amp group 130 can be reduced relative to the pixel signal by switching the gain of the column amp group 130, which makes it possible to improve the S/N ratio.

The present embodiment assumes that the gain of the column amp group 130 is analog gain, and that the column amp group 130 has discrete gain settings. Specifically, settings of 2× and 4× are provided, where 2× is the normal setting, which is switched to 4× in low-light situations.

In the case where a pixel signal having a signal level near the determination level Vs has been amplified by switching the gain setting of the column amp group 130, it is necessary to change the determination level Vs to a high level in accordance with the gain resulting from the gain switch. This is because the position in the image at which signal level gaps arise will change suddenly in the unlikely event that a level gap occurs. This is particularly noticeable in images where there are many pixels in which a signal level gap occurs after the gain of the column amp group 130 is switched. The present embodiment will describe a method for setting the cyclic coefficient when changing the determination level Vs in accordance with the gain of the column amp group 130 being switched.

In the present first embodiment, the setting value of the multiplication value q for multiplication with the cyclic coefficient p is changed in accordance with the determination level Vs changed after the gain of the column amp group 130 has been switched. FIG. 17 illustrates multiplication values q to be multiplied with the cyclic coefficient, for each determination level Vs after the gain of the column amp group 130 has been switched. Here, it is assumed that the AD conversion range is a maximum of 12 bits (0 to 4095 LSB), and that a reference value for the multiplication value q (×1.0) ensures that the determination level Vs after the gain of the column amp group 130 has been switched is in a range of 0 to 511 LSB, where level gaps are least noticeable.

In the case where the determination level Vs after the gain of the column amp group 130 has been switched is 2048 to 4095 LSB, the multiplication value q is set to 4.0× relative to the stated reference value, and in the case where the determination level Vs is 512 to 2047 LSB, the multiplication value q is set to 2.0× relative to the reference value. In other words, the adaptability is improved by setting the cyclic coefficient to be higher as the level gaps become more noticeable. Although the multiplication value q is set to 4.0× in the case where the signal level is 2048 to 4095 LSB after the column amp switch in the present embodiment, the multiplication result is assumed to be 1.0 in the case where the product of the cyclic coefficient p and the multiplication value q is greater than 1.0.

Through this, the offset correction value βf(n) is caused to quickly converge near the ideal value by temporarily increasing the cyclic coefficient in the case where the determination level Vs is high after the gain of the column amp group 130 has been switched, or in other words, in the case where signal level gaps in the S signal are noticeable. On the other hand, fluctuations in the offset correction value βf(n) are reduced by keeping the cyclic coefficient low in the case where the determination level Vs is low after the gain of the column amp group 130 has been switched, or in other words, in the case where signal level gaps in the S signal are less noticeable. It is also possible to apply the multiplication value only after the gain of the column amp group 130 has been switched.

As described thus far, when the determination level is to be changed in accordance with the gain of the column amp group 130 being switched, the cyclic coefficient setting value is changed in accordance with the magnitude of the determination level Vs set after the gain of the column amp group 130 has been switched. Through this, the amount of time required for the offset correction value βf(n) to converge near the ideal value and the effect of reducing fluctuations in the offset correction value caused by noise can be optimized while maintaining a state where gaps are not easily noticeable in the image.

Although several examples of preferred filtering process methods have been described thus far, the cyclic coefficient may be determined taking a plurality of such methods into consideration. Furthermore, although the present embodiment describes the cyclic coefficient as a single example, the method for setting the cyclic coefficient with respect to various conditions is not necessarily limited to the content of the present embodiment, and the cyclic coefficient may be determined in accordance with change amounts in the ideal value caused by the conditions under which noise occurs, the temperature changing rate, the switching of driving of the image sensor, and so on.

Second Embodiment

Hereinafter, a second embodiment of the present invention will be described. The image capturing apparatus used in the second embodiment has the same configuration as the image capturing apparatus described with reference to FIG. 1 in the first embodiment, and thus descriptions thereof will be omitted, and only the differences will be described.

Figure 18:
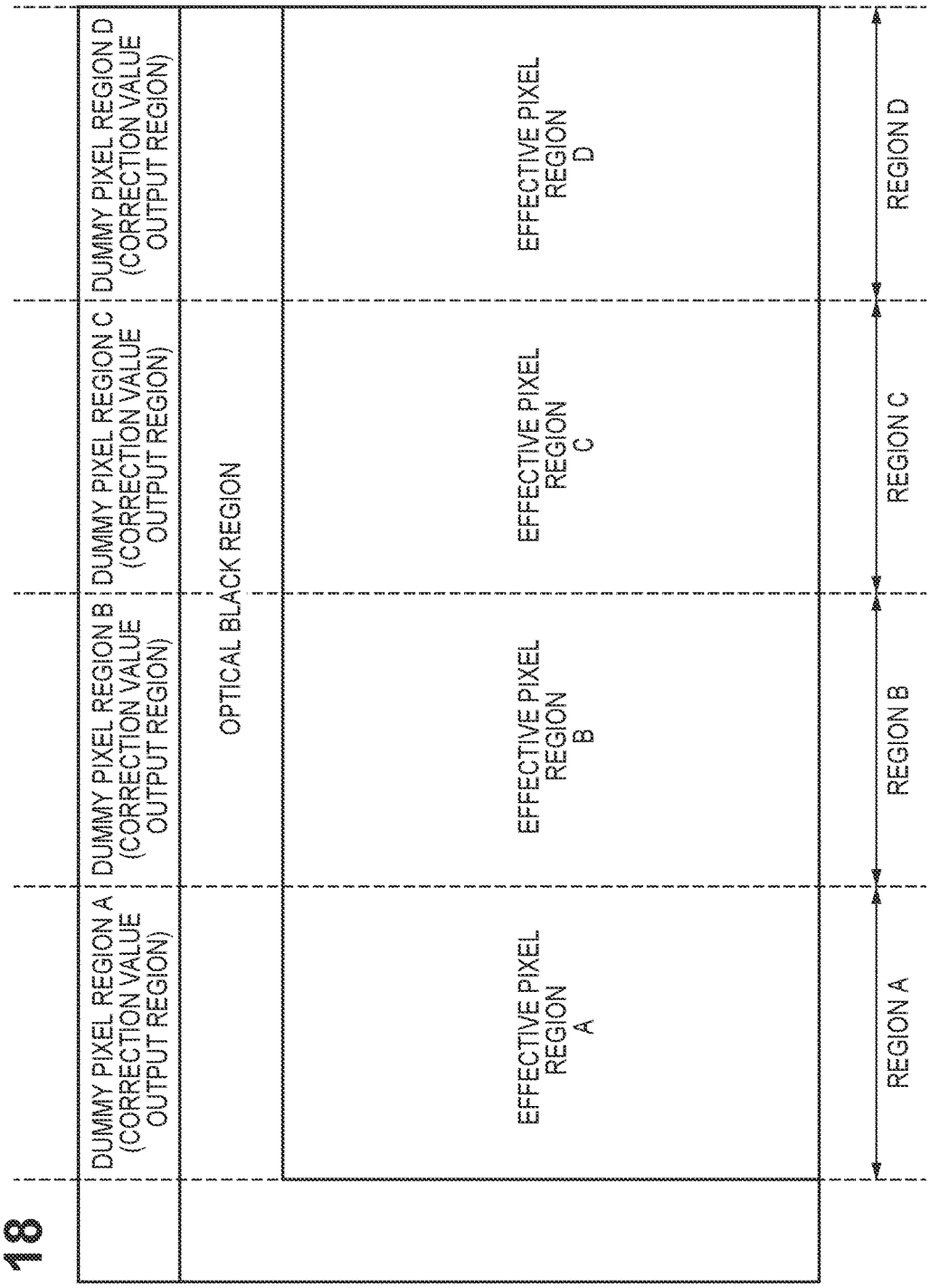
FIG. 18 is an explanatory view illustrating a case where an offset correction value or a detected value is calculated for each of regions in the image sensor according to the present invention.

As opposed to the configuration of the pixel section 110 according to the first embodiment, illustrated in FIG. 5, the effective pixel region is divided into four parts in the horizontal direction in the second embodiment, as illustrated in FIG. 18. The regions are taken as an effective pixel region A, an effective pixel region B, an effective pixel region C, and an effective pixel region D, in that order from the left of the screen. In addition, corresponding to the effective pixel regions, the dummy pixel region is also divided into four parts in the horizontal direction, resulting in a dummy pixel region A, a dummy pixel region B, a dummy pixel region C, and a dummy pixel region D, in that order from the left of the screen. By dividing the regions into several regions in the horizontal direction, correction that is closer to the ideal value can be carried out even in the case where the performance of the AD converters varies in the horizontal direction.

In the aforementioned first embodiment, the slope ratio α and the offset amount β are calculated using the dummy pixels of the entire screen, but in the present embodiment, α and β are calculated through the aforementioned Formula (3) for each of the regions A to D obtained through the stated division. The same processing as in the first embodiment is carried out for offset correction values βf calculated for each of the stated regions, thus ensuring that signal level gaps cannot be seen.

As described thus far, a plurality of regions are obtained through division in the horizontal direction, and the offset correction value βf(n) is calculated for each region. Through this, correction that is closer to the ideal value can be carried out even in the case where the performance of the AD converters varies in the horizontal direction, and furthermore, the same effects as those of the first embodiment can be achieved.

Third Embodiment

Next, a third embodiment of the present invention will be described. The image capturing apparatus used in the third embodiment has the same configuration as the image capturing apparatus described with reference to FIGS. 1 and 2A in the first embodiment, and thus descriptions thereof will be omitted. AD conversion according to the third embodiment is also carried out using the method described with reference to FIGS. 2B to 6, and thus descriptions thereof will be omitted.

As described above in the first embodiment, it is necessary to reduce to the greatest extent possible sudden changes in the correction value occurring when power is turned on and immediately after the driving method of the image sensor 1 is switched, temporary fluctuations in the correction value caused by noise in the power source supplied to the column amp group 130, interconnect noise, and external noise, and so on. As will be described later, these fluctuations in the correction value are caused by fluctuations in a detected value for calculating the correction value, obtained using the dummy pixels. The present third embodiment describes a method for reducing fluctuations in the detected value obtained for calculating the correction value.

As described above, the slope ratio α and the offset amount β can be found through Formula (1) and Formula (2), respectively.

$$\alpha = (V2L - V1L)/(V2H - V1H) \qquad (1)$$

$$\beta = (V2L - V1L)/(V2 - V1) \times Vs - \alpha(V2H - V1H)/(V2 - V1) \times Vs \qquad (2)$$

Here, the detected values V1H, V1L, V2H, and V2L obtained for calculating the correction values α and β will be focused on. For example, the detected value V1H, which is obtained by AD-converting the analog signal of the fixed voltage V1 using the second ramp signal VRAMP (steep slope) whose slope is high, may experience a large level fluctuation when power is turned on, after the image sensor driving method is switched, or when external noise occurs. If a fluctuation occurs in even one of the obtained detected values V1H, V1L, V2H, and V2L, the slope ratio α and the offset amount β calculated on the basis of those detected values will deviate from the originally-intended ideal value. As a result, a level gap occurs in the signal levels near the S signal determination level, resulting in an unnatural video.

In other words, it is necessary to suppress fluctuations in the detected values V1H, V1L, V2H, and V2L to the greatest extent possible in order to suppress a degradation in the image quality caused by signal level gaps while improving the tone accuracy in order to improve the S/N ratio and expand the dynamic range. Furthermore, it is necessary to reduce fluctuations in the offset correction value β calculated from the detected value to no greater than a level at which the level gaps cannot be seen in the image (the limit value).

Hereinafter, a method for reducing fluctuations in the detected values V1H, V1L, V2H, and V2L will be described in detail. Although the present third embodiment will only describe with respect to V1H among the detected values, fluctuations in the detected values V1L, V2H, and V2L can be reduced in the same manner.

Figure 19:
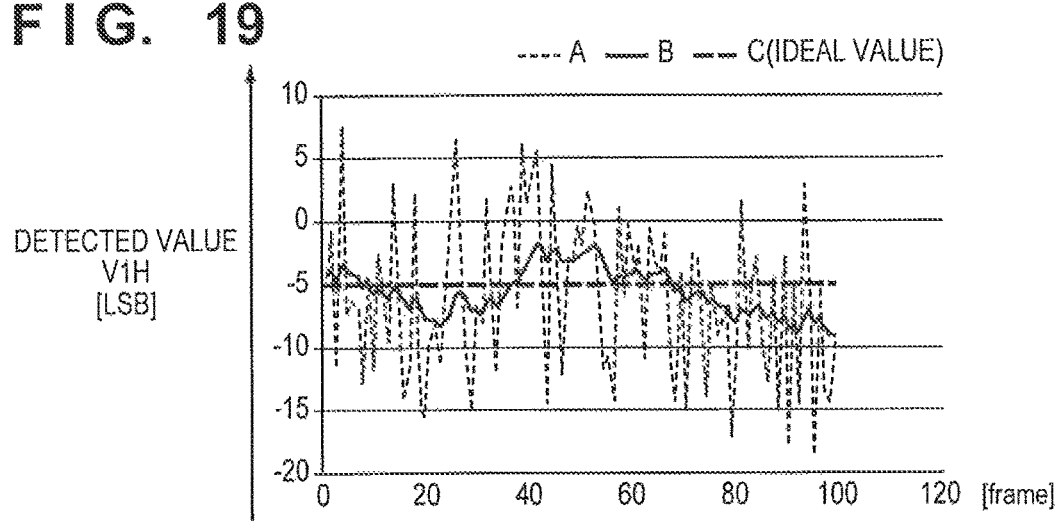
FIG. 19 is a diagram illustrating an example of fluctuations in a detected value V1H according to a third embodiment.

FIG. 19 is a graph illustrating fluctuations in the detected value V1H when the detected values (V1H, V1L, V2H, and V2L) are obtained on a frame-by-frame basis, under conditions in which noise that causes those detected values to fluctuate is occurring. In FIG. 19, the abscissa represents a frame number (corresponding to time), the ordinate represents the detected value V1H, and changes in the detected value V1H from frame to frame are indicated by graph A. Meanwhile, an ideal detected value V1H in a state where there is no influence from noise (an ideal value) is indicated by a graph C. Although the ideal value does not fluctuate due to noise components or the like that occur irregularly, the ideal value does change due to driving settings of the image sensor, temperature changes in the image sensor, and so on. In the third embodiment, it is assumed that the driving settings of the image sensor are consistent and the temperature is sufficiently stable.

In the third embodiment, it is assumed, for descriptive purposes, that the value of the detected value V1H being a consistent −5 LSB from frame 1 to frame 100 is ideal, as indicated by graph C. It is furthermore assumed that the value of the offset correction value β calculated using the detected value begins to cause signal level gaps to appear in the image when the value of graph A exceeds ±5 LSB (less than or equal to −10 LSB or greater than or equal to 0 LSB) relative to the value of graph C, which is the ideal value.

In the example illustrated in FIG. 19, there are many frames where the value of the graph A exceeds the value of the graph C, which is the ideal value, by ±5 LSB. In other words, a video in which a gap is visible in a given frame but disappears in the next frame is repeated any number of times. Here, a method for reducing fluctuations in the detected value V1H will be described in detail.

One method for reducing fluctuations in the detected value V1H is a method that carries out a filtering process using the following Formula (5).

$$V1Hf(n)=V1H(n)\times p+V1Hf(n-1)\times(1-p) \quad (0\le p\le 1) \quad (5)$$

In Formula (5), V1Hf(n) represents the detected value in an nth frame after the filtering process. Meanwhile, a new detected value obtained during readout period for dummy pixels obtained in the nth frame is defined as V1H(n), the detected value in an n−1th frame after the filtering process is defined as V1Hf(n−1), and a cyclic coefficient is defined as p(0≤p≤1). The range that n can take on is n≥0, and is set so that in the case where n=0, V1Hf(n−1)=0 in a state where p is set to 1.0, due to the offset correction value V1Hf(−1) of a previous frame not existing.

A graph B in FIG. 19 represents changes in the value of the post-filtering process detected value V1Hf(n) when the cyclic coefficient p is set to 0.1 in the aforementioned Formula (5). As can be seen from this graph, by carrying out the filtering process on the graph A, the value of the detected value V1Hf(n) before the filtering process falls within a range of ±5 LSB from the graph C, which corresponds to a limit value where signal level gaps begin to appear in the image when calculating the correction value.

Although the cyclic coefficient p is set to 0.1 in the example illustrated in FIG. 19, it is not absolutely necessary for p to be 0.1, and the cyclic coefficient may be determined in accordance with the magnitude of the fluctuations in the detected value V1H(n) caused by the noise. Furthermore, a process using a program may be carried out as a means for carrying out the filtering process, or a filtering process circuit may be added to the interior of the image sensor 1 or to the image processing section 2.

The slope ratio α and the offset value β are found through Formulas (1) and (2) on the basis of the detected value obtained as described above. Using the slope ratio α and offset value β found in this manner as correction coefficients, a digital signal $S_D(n)$ of the S signal in the nth frame AD-converted using the second ramp signal VRAMP (steep slope) is corrected, and a corrected digital signal $S'_D(n)$ is obtained, through the following Formula (6).

$$S'_D(n)=S_D(n)\times\alpha+\beta \quad (6)$$

As described above, a filtering process is carried out on the detected value obtained using the signal obtained by reading out the fixed voltage in the dummy pixel readout period. Through this, fluctuations in the detected value can be brought below the limit value at which level gaps appear, and a degradation in image quality caused by signal level gaps can be reduced.

Several examples of favorable filtering process methods will be described below.

(1) When Detected Value has Sudden High Fluctuation

As described above, in the case where the detected value has fluctuated due to noise in the power source supplied to the column amp group 130, interconnect noise, external noise, or the like, the detected value can be stabilized by carrying out the filtering process with a reduced cyclic coefficient. However, the following problems occur if the value of the cyclic coefficient p is reduced too much. That is, it will take time for the value of the post-filtering process detected value V1Hf(n) to converge near the ideal value in the case where the ideal value (a value ideally obtained as the detected value) has changed suddenly due to a sudden change in temperature, a switch in the driving method of the image sensor, or the like. On the other hand, if the cyclic coefficient is increased, the effect of the filtering process on reducing fluctuations in the detected value will weaken, resulting in frames in which signal level gaps can be seen.

Accordingly, the cyclic coefficient p is set to 0 in the case where the newly-obtained pre-filtering process detected value V1H(n) clearly fluctuates greatly relative to the post-filtering process detected value V1Hf(n−1) of the previous frame. Through this, the cyclic coefficient p becomes a setting value that can sufficiently adapt to fluctuations in the ideal value, and sudden changes in the detected value V1H due to external noise or the like can also be suppressed, which makes it possible to reduce the influence of noise. External noise in particular can produce sudden extremely large level fluctuations, and there are thus cases where it is not possible to achieve both optimization of the amount of time in which the post-filtering process detected value V1Hf(n) converges near the ideal value and stabilization of the detected value relative to the external noise or the like.

Figure 20A:
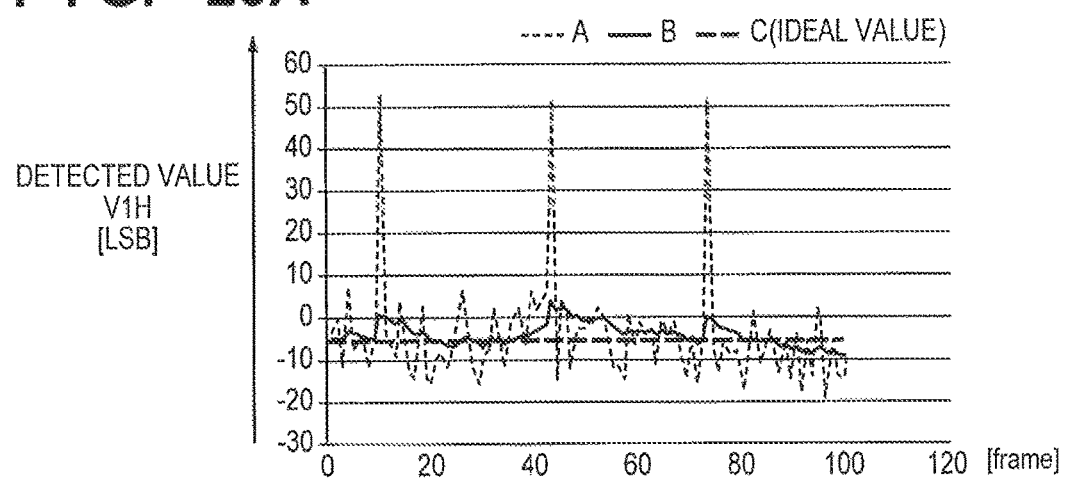
FIGS. 20A and 20B are diagrams for explaining a detected value V1H filtering process carried out when external noise is occurring according to the third embodiment.

FIG. 20A is a graph illustrating fluctuations in the detected value V1H(n) in the case where external noise has occurred. In the example illustrated in FIG. 20A, external noise is occurring in three frames as compared to the example illustrated in FIG. 19; however, the rest is the same as in FIG. 19, and thus detailed descriptions of FIG. 20A will be omitted.

In FIG. 20A, there are three frames (the 13th, 43rd, and 73rd frames) in which the value of graph A is approximately 60 LSB higher than the value of graph C, which represents the ideal value. Accordingly, as indicated by graph B, frames in which the post-processing result exceeds ±5 LSB from graph C, which represents the limit value, occur despite the filtering process having been carried out. In other words, frames in which gaps can be seen occur across only several frames among the 100 frames, and then video in which gaps cannot be seen are periodically repeated.

Accordingly, in the third embodiment, a difference between the newly-obtained detected value V1H(n) and the filtering process result V1Hf(n−1) for the detected value used up to the previous frame is found before carrying out the filtering process using the aforementioned Formula (5). It is then determined whether or not that difference exceeds a threshold, and control is carried out to set the cyclic coefficient p to 0 in the case where the threshold is exceeded. Although the threshold is set to ±30 LSB in the third embodiment, it is preferable that the threshold be determined in accordance with the noise level when external noise is not occurring (a random fluctuation caused by the power source voltage, patterned interconnects, and so on) and the setting value for the cyclic coefficient. Ideally, it is preferable that the threshold be set so that the offset correction value β calculated using the post-filtering process detected value V1Hf(n) does not exceed the limit value at which signal level gaps begin to appear in the image even in the case where external noise has occurred.

Figure 20B:
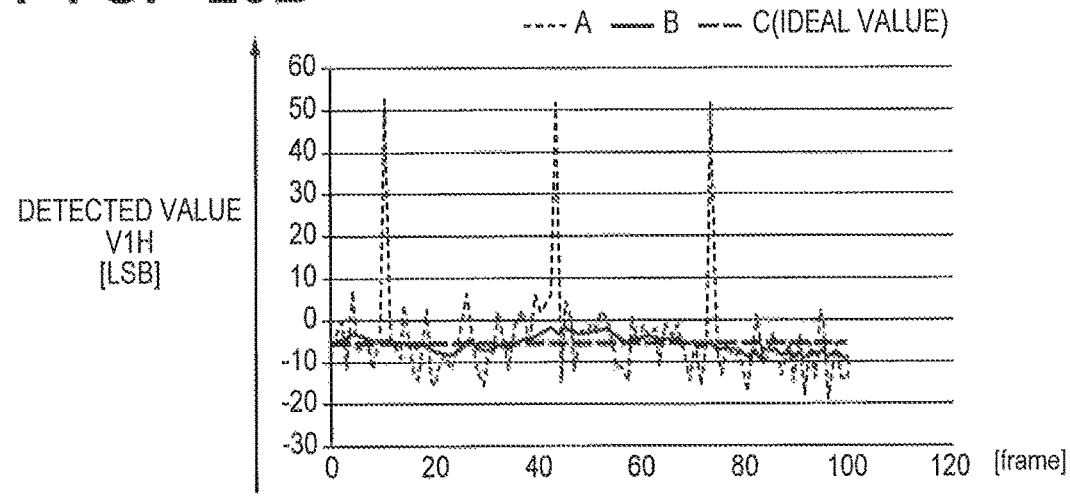

Graph B in FIG. 20B represents the filtering process result in the case where the threshold determination has been added. In FIG. 20B, the threshold is set to ±30 LSB, and in the three frames where external noise has occurred, the cyclic coefficient p is 0 and the post-filtering process detected value V1H(n−1) from the previous frame is carried over. By adding this process, the post-filtering process detected value V1Hf(n) stays within a range less than or equal to the limit value at which signal level gaps begin to appear, in all of the images.

As described above, a difference between the post-filtering process detected value V1H(n−1) from the previous frame and the newly-obtained detected value V1H(n) is found before the filtering process is carried out. It is then determined whether or not that difference value exceeds a threshold, and the cyclic coefficient p is set to 0 in the case where the threshold is exceeded. Through this, the influence of the post-filtering process detected value V1Hf(n) can be suppressed in the case where a sudden large fluctuation has occurred due to external noise or the like. Furthermore, both optimization of the amount of time in which the post-filtering process detected value V1Hf(n) converges near the ideal value and stabilization of the detected value relative to the external noise or the like can be achieved.

Although the present embodiment describes external noise, the embodiment can also be applied in all cases where similar noise occurs.

(2) When Power is Turned on and when Image Sensor Driving Method is Switched

When power is turned on, the video signal output may be unstable, and the driving method of the image sensor 1 may be switched in order to carry out various types of processing at startup; as such, the ideal value may change greatly. Furthermore, even after power has been turned on, the ideal value undergoes sudden great changes immediately after the image sensor driving method is switched. These factors cause a difference between the post-filtering process detected value V1Hf(n) and the ideal value to increase suddenly.

The amount of time required until the value converges near the ideal value can be minimized by not carrying out the filtering process. However, if the filtering process is not carried out, fluctuations in the detected value V1H(n) caused by power source noise or the like become unable to be reduced after the detected value V1Hf(n) has converged near the ideal value.

Accordingly, in the present embodiment, a difference between the newly-obtained detected value V1H(n) and the post-filtering process detected value V1Hf(n−1) from the previous frame is found before the filtering process is carried out, and the cyclic coefficient is changed in accordance with the magnitude of that difference value. Specifically, the cyclic coefficient is set higher in the case where the difference value is high and the cyclic coefficient is set lower in the case where the difference value is low. The cyclic coefficient may be determined for the difference value in accordance with the amount of change in the ideal value, the magnitude of fluctuations in the detected value caused by power source noise and so on, or the like.

In the present embodiment, table data indicated in FIG. 21A is provided in advance, and the cyclic coefficient p corresponding to the difference value between the newly-obtained detected value V1H(n) and the post-filtering process detected value V1Hf(n−1) from the previous frame is determined by referring to that table data. Ideally (that is, in the case where the detected value does not change due to power source noise or the like), the difference values indicated in the table data of FIG. 21A are set to setting values at which the post-filtering process detected value converges at a value lower than the limit value at which signal level gaps begin to appear in the image within a single frame, when calculating the correction value. Although the table data indicated in FIG. 21A only includes positive difference values, this is for descriptive purposes, and the same applies to negative difference values; strictly speaking, the values are absolute values |V1H(n)−V1Hf(n−1)|.

FIG. 21B is a graph illustrating the setting value of the cyclic coefficient based on the table data in FIG. 21A and changes in the detection difference value V1H(n)−V1Hf(n−1) before and after the driving method of the image sensor 1 is switched. In FIG. 21B, the solid line represents a graph for the case where the setting value of the cyclic coefficient has been changed in accordance with the offset correction difference value, and the broken line represents a graph for the case where the setting value of the cyclic coefficient is not changed. 10 LSB, which is the limit value at which signal level gaps can appear in the image when calculating the correction value, is also provided as a reference.

In FIG. 21B, the detection difference value is near almost 0 LSB (strictly speaking, fluctuations caused by power source noise or the like are superimposed) before the driving method of the image sensor 1 is switched, and thus the cyclic coefficient p is set to 0.1. The cyclic coefficient p remains set to 0.1 during the period until the driving method of the image sensor 1 is switched.

Control carried out when the driving method of the image sensor 1 is switched will now be described. In the frame immediately following the switch (the first frame), a detection difference value of 60 LSB occurs, and thus the cyclic coefficient p is set to 0.9 on the basis of the table data illustrated in FIG. 21A. By doing so, a detected value near the ideal value can be obtained after the driving method switch, even in the frame immediately following the driving method switch. In the present embodiment, ideally (that is, in the case where the detected value does not change due to power source noise or the like), the detected value can be reduced to 10 LSB or less by changing the cyclic coefficient.

In the second frame after the driving method is switched, the detection difference value has become 10 LSB, and thus the cyclic coefficient p is set to 0.1 on the basis of the table data in FIG. 21A. The cyclic coefficient p is continuously set to 0.1 for the frames that follow thereafter in the case where the detection difference value is 10 LSB or less.

As opposed to this, in the case where the driving method is switched while the cyclic coefficient p remains set at 0.1, 18 frames are required to cause the detection difference value to converge on a value less than or equal to the limit value at which signal level gaps begin to appear in the image. However, by finding the detection difference value and changing the cyclic coefficient p in accordance with the magnitude thereof, the detected value becomes less than or equal to the limit value after one frame, and furthermore, fluctuations in the detected value due to power source noise or the like can be reduced after converging near the ideal value.

As described above, when power is turned on and in the case where the image sensor driving method is switched, the difference between the newly-obtained detected value V1H(n) and the post-filtering process detected value V1Hf(n−1) for the detected value up until the previous frame is found before carrying out the filtering process. The cyclic coefficient is then changed in accordance with the magnitude of that difference value. Through this, the convergence time of the detected value V1Hf(n) can be reduced even if the difference between the post-filtering process detected value V1Hf(n) and the ideal value has suddenly increased. In addition, fluctuations in the detected value caused by power source noise or the like can be reduced after the detected value V1Hf(n) has converged near the ideal value.

(3) When Temperature has Changed

A change in the temperature of the image sensor 1 is one cause of the ideal detected value changing. In particular, when the image sensor 1 begins to be driven after power is turned on, a sudden rise in temperature occurs due to power consumption starting in the image sensor 1; to suppress this rise in temperature, cooling may be carried out using a cooling device such as a fan or a Peltier element, which can cause a sudden drop in temperature. The ideal value of the post-filtering process detected value may change suddenly due to such sudden changes in temperature.

When the ideal value has changed suddenly in this manner, it may not be possible to adapt to the ideal value in the case where the cyclic coefficient is set to a lower value and the filtering process is carried out in order to suppress fluctuations in the detected value V1Hf(n) caused by power source voltage fluctuations, patterned interconnect noise, and so on, as described above.

Accordingly, in this embodiment, an inter-frame temperature change is detected from temperatures measured using a thermistor, a temperature detection sensor, or the like, and a process for changing the cyclic coefficient in accordance with a changing rate of the temperature is then carried out. Specifically, the cyclic coefficient is set higher in the case where the changing rate of the temperature is high, and the cyclic coefficient is set lower in the case where the changing rate of the temperature is low. Through this, the post-filtering process detected value V1Hf(n) can adapt to the ideal value even in the case where the ideal value has changed suddenly due to a sudden change in temperature. Meanwhile, in the case where the ideal value does not change suddenly, fluctuations in the detected value V1H(n) caused by power source noise or the like can be reduced.

A method for setting the cyclic coefficient will be described with reference to the aforementioned FIGS. 10 to 13 and FIGS. 22A and 22B.

FIG. 10 is a conceptual diagram illustrating a temperature, a temperature changing rate, and the cyclic coefficient setting value relative to changes in time (frames). In FIG. 10, "temperature" indicates a temperature value obtained by a thermistor, a temperature detection sensor, or the like. The "temperature changing rate" indicates an amount by which the temperature has increased (a differential value of the temperature graph) per unit of time (per frame, in the present embodiment). In the present embodiment, regions A to E are provided in order from the highest temperature changing rate down, but when actual control is carried out, it is preferable to use a numerical value obtained by dividing the temperature change amount by the unit of time. The "cyclic coefficient setting value" indicates the setting value of the cyclic coefficient for the temperature changing rates A to E. In the present embodiment, the temperature changing rate A corresponds to 0.5; the temperature changing rate B, to 0.4; the temperature changing rate C, to 0.3; the temperature changing rate D, to 0.2; and the temperature changing rate E, to 0.1.

In FIG. 10, the temperature changing rate is in the region B during a period from immediately after startup to t1, and thus the cyclic coefficient setting value is set to 0.4. The temperature changing rate is in the region C during a period from t1 to t2, and thus the cyclic coefficient setting value is set to 0.3. The temperature changing rate is in the region D during a period from t2 to t3, and thus the cyclic coefficient setting value is set to 0.2. The temperature changing rate is in the region E from t3 on, and thus the cyclic coefficient setting value is set to 0.1.

In this manner, the cyclic coefficient is increased in the case where the changing rate of the temperature is high, and the cyclic coefficient is reduced in the case where the changing rate of the temperature is low. Through this, the post-filtering process detected value V1Hf(n) can be adapted to the ideal value even in the case where the ideal value has changed suddenly due to a sudden change in temperature. Meanwhile, in the case where the ideal value does not change suddenly, fluctuations in the detected value V1Hf(n) caused by power source noise or the like can be reduced.

Although the example illustrated in FIG. 10 indicates a case where the temperature rises, the same applies to cases where the temperature drops, and specifically, the cyclic coefficient setting value is set in accordance with an absolute value of the temperature changing rate.

(4) Subject Contrast

Although signal level gaps will appear in the image in the case where the detected value V1H(n) has fluctuated, how noticeable the gaps are changes depending on the contrast and brightness of the subject. FIGS. 11A and 11B are histograms illustrating a brightness distribution of a single frame's worth of an image, where the abscissa represents a signal level and the ordinate represents the frequency (a number of pixels) of a brightness occurring within the image of the single frame. Meanwhile, the determination level Vs indicates a signal level at which the ramp signal is switched between the first ramp signal VRAMP (gentle slope) and the second ramp signal VRAMP (steep slope).

Many pixels having a brightness near the determination level Vs are present in an image that produces a histogram such as that illustrated in FIG. 11A. In other words, it is assumed that the subject is highly likely to be a subject having a low contrast, in which the brightness gradually changes central to a brightness level in the vicinity of the determination level Vs. Such an image can therefore be considered an image in which pixels having a brightness near the determination level Vs occur at a high frequency, and thus signal level gaps can be easily seen. It is preferable that the cyclic coefficient be set lower for such an image in order to stabilize the post-filtering process detected value V1Hf(n) to the greatest extent possible.

On the other hand, there are not so many pixels near the determination level Vs in an image that produces a histogram such as that illustrated in FIG. 11B. In other words, it is assumed that the subject has a high contrast and that a variety of brightnesses are present in a balanced manner throughout the entire image. Such an image can therefore be considered an image in which pixels having a brightness near the determination level Vs occur at a low frequency, and thus signal level gaps cannot be easily seen. It is not very necessary to stabilize the post-filtering process detected value V1Hf(n) for such an image, and thus it is preferable that the adaptability to the ideal value be improved by setting the cyclic coefficient to a higher value.

In the present embodiment, an optimal cyclic filter coefficient is determined in accordance with the histogram (brightness distribution). Specifically, pixels having a signal level near the determination level Vs are weighted, and a weighted accumulated value is calculated by accumulating the number of pixels that have been weighted, thus finding how many pixels are present near the determination level Vs. The cyclic coefficient setting value used in the filtering process is then determined in accordance with the weighted accumulated value.

FIG. 12A illustrates an example of a weighting coefficient used in the weighting. The abscissa represents the signal level, whereas the ordinate represents the weighting coefficient. In FIG. 12A, the coefficient at the signal level corresponding to the determination level Vs is set to 1.0, and the weighting coefficient is reduced as the difference between the signal level and the determination level Vs increases. In the case where a difference between the signal level and the weighting coefficient of the determination level Vs is high to a certain extent, it is unlikely that signal level gaps will affect the image, and thus the weighting coefficient is set to 0. Note that the magnitude of fluctuations in the detected value V1H(n) caused by power source noise or the like, which can occur near the level of the S signal, may be taken into consideration when determining the signal level at which to set the weighting coefficient to 0.

The weighted accumulated value is calculated by accumulating only the number of pixels that have been weighted through the aforementioned method. The cyclic coefficient setting value used in the filtering process is then determined in accordance with this calculated accumulated value.

FIG. 12B is a conceptual diagram illustrating the cyclic coefficient setting value relative to the weighted accumulated value. The abscissa represents the weighted accumulated value, whereas the ordinate represents the cyclic coefficient setting value. As illustrated in FIG. 12B, the cyclic coefficient setting value decreases as the weighted accumulated value increases.

By carrying out the aforementioned processing, it can be determined whether or not signal level gaps can be easily seen for the subject, and the cyclic coefficient setting value is then changed in accordance with the result of the determination. Through this, the post-filtering process detected value V1Hf(n) can be stabilized and the adaptability to the ideal value can be optimized in accordance with the brightness distribution of the captured subject.

Although the present embodiment describes using a histogram for the image as a whole, the image may be divided into a plurality of regions and histograms may be created for each region. Doing so makes it possible to more accurately realize the aforementioned optimization even for subjects in which gaps occur easily in some regions within an image but do not occur easily in other regions.

As described above, pixels having a signal level near the determination level are weighted, a weighted accumulated value is calculated by accumulating the number of pixels that have been weighted, and the cyclic coefficient setting value is changed in accordance with that accumulated value result. Through this, the detected value can be stabilized and the adaptability to the ideal value can be optimized in accordance with the brightness distribution of the captured subject.

(5) Framerate

As described above, the ideal value changes in accordance with temperature changes. In order to ensure that the post-filtering process detected value V1Hf(n) adapts to that ideal value, it is necessary to obtain the detected value V1H(n) frequently and update the detected value V1H(n).

However, when the framerate is low, the detected value V1H(n) cannot be obtained frequently, and thus it is possible, depending on the framerate, that the post-filtering process detected value V1Hf(n) will adapt to changes in the ideal value in a delayed manner. In particular, it is necessary to set the cyclic coefficient lower in the case where there are great fluctuations in the detected value V1H(n) due to power source noise or the like, and thus the detected value V1Hf(n) adapts to fluctuations in the ideal value caused by sudden temperature changes in a delayed manner. Accordingly, in the present embodiment, the cyclic coefficient setting value is changed in accordance with the framerate.

FIG. 13 illustrates setting values for the cyclic coefficient p for framerates. The setting value of the cyclic coefficient p increases as the framerate decreases, and the setting value of the cyclic coefficient p decreases as the framerate increases. In other words, the amount of influence the newly-obtained detected value V1H(n) has on the post-filtering process detected value V1Hf(n) increases as the number of detected values V1H(n) that can be obtained per unit of time decreases. Accordingly, it is easier to adapt to fluctuations in the ideal value caused by temperature changes at lower framerates. A framerate range may be determined for each cyclic coefficient by taking into consideration the temperature changing rate and fluctuations in the detected value V1H(n) caused by power source noise or the like.

As described thus far, by changing the cyclic coefficient setting value in accordance with the framerate, the post-filtering process detected value can be adapted to fluctuations in the ideal value and the stabilization of the detected value can be optimized even at low framerates, where the detected value is updated less frequently.

(6) Frames Not Used for Video

A case where the cyclic coefficient is changed in accordance with the framerate has been described above, but depending on the processing performed by the image sensor 1, there are cases where an image is read out from the image sensor 1 but is not actually used as an output image. For example, assume that images are read out from the image sensor 1 at 120 fps, and a video is output at 30 fps. In this case, of four frames' worth of images, only one image will be used for the actual image.

As described earlier, obtaining the detected value as frequently as possible makes it possible to ensure that the detected value in the filtering process is stabilized, and thus the detected value V1H(n) is also found for the images of frames not used in the video output and is used in the filtering process. Specifically, a difference is found between a result of carrying out the filtering process using only the detected value V1H(n) of the frames used for the video output, and a result of carrying out the filtering process using the detected value V1H(n) of the frames not used in the video output in addition to the detected value V1H(n) of the frames used for the video output. Through this, a stability level of the detected value V1H(n) is determined. It is determined that the detected value is not stable when the stated difference is high, and is determined that the detected value is stable when the stated difference is low.

In the case where the determination result indicates that the stability level is high, there is little fluctuation in the detected value due to power source noise or the like, and thus the cyclic coefficient is set higher in order to accelerate the adaptability. On the other hand, in the case where the stability level is low, there is a large amount of fluctuation in the detected value due to power source noise or the like, and thus the cyclic coefficient is set lower.

In the present embodiment, the detected value used when carrying out the filtering process using only the frames output as video is represented by V1Hf(n), and the detected value used when carrying out the filtering process also using the frames not output as video is represented by V1Hf'(n). V1Hf(n)−V1Hf'(n) is then calculated to determine the stability level.

Figures 22A, 22B:
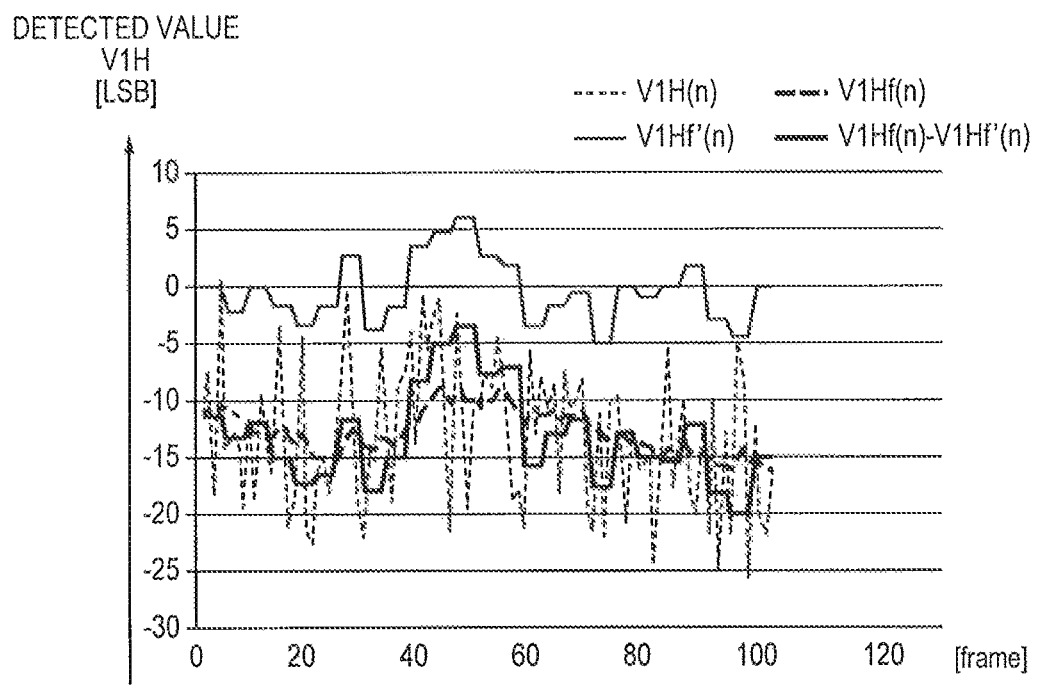
FIGS. 22A and 22B are diagrams illustrating cyclic coefficient setting values in the case where the cyclic coefficient is determined in accordance with a stability level of the detected value, according to the third embodiment.

FIG. 22A is a graph indicating the detected value V1H(n), the detected value V1Hf(n) used when carrying out the filtering process using only the images output as video, the detected value V1Hf'(n) used when carrying out the filtering process also using the images not output as video, and V1Hf(n)−V1Hf'(n) representing the stability level, relative to changes over time (frames).

In FIG. 22A, the abscissa represents time (when expressed as frames, a period of 1 to 100 frames), whereas the ordinate represents the detected values V1H(n), V1Hf(n), V1Hf'(n), and the difference value V1Hf(n)−V1Hf'(n). In the present embodiment, the cyclic coefficient is set higher for the detected value V1Hf(n) used when carrying out the filtering process using only the images output as video. On the other hand, the cyclic coefficient is set to a minimum for the detected value V1Hf'(n) used when carrying out the filtering process also using the images not output as video, in order to obtain as stable a detected value as possible (to serve as a reference for determining the stability level). The greater the difference value V1Hf(n)−V1Hf'(n) is at this time, the less stable the detected value V1Hf(n) is.

In the present embodiment, values of a multiplication value q, which is based on the magnitude of the difference value V1Hf(n)−V1Hf'(n) and is used for multiplication with the cyclic coefficient p, are held as table data as illustrated in FIG. 22B, and a process for multiplying the cyclic coefficient p by the multiplication value q is carried out on the basis of this table data. By doing so, the cyclic coefficient can be optimized in the case where the cyclic coefficient used to calculate the detected value V1Hf(n) when carrying out the filtering process using only the images output as video is not suitable in terms of the stability level. Although the table data indicated in FIG. 22B only includes positive difference values, this is for descriptive purposes, and the same applies to negative difference values; strictly speaking, the values are absolute values |V1Hf(n)−V1Hf'(n)|.

As described above, a difference is found between a result of carrying out the filtering process using only the detected value V1H(n) of the frames used for the video output, and a result of carrying out the filtering process using the detected value V1H(n) of the frames not used in the video output in addition to the detected value V1H(n) of the frames used for the video output. Then, by finding the stability level of the detected value of the frames used in the video output and changing the cyclic coefficient in accordance with the stability level, the cyclic coefficient can be optimized.

(7) Subject Movement

The way in which level gaps caused by fluctuations in the detected value V1H(n) caused by the power source noise or the like appear changes depending on the subject. In particular, in moving pictures, such gaps are easy to see in states where there is no subject movement; however, when the subject is moving, the signal levels of the pixels are constantly changing, and thus the gaps are less noticeable.

Accordingly, in the present embodiment, a process for determining the cyclic coefficient in accordance with a movement amount of the subject is carried out. A generally-used method of employing a gyrosensor, a method that detects the movement amount by calculating a motion vector from an obtained image, and so on can be used to detect the movement amount. It is assumed that a known technique is used to detect the movement amount of the subject, and thus detailed descriptions thereof will be omitted here.

FIG. 15 illustrates table data indicating the multiplication value q multiplied with the cyclic coefficient, corresponding to movement amounts of the subject. In the present embodiment, a case where there is a low movement amount for the subject is taken as a reference (1.0×), and processing is carried out so that the cyclic coefficient is increased as the movement amount of the subject increases so that the detected value V1Hf(n) can be adapted to the ideal value with ease. Although the multiplication value q is set to 4.0× when there is a high movement amount for the subject in the present embodiment, the multiplication result is assumed to be 1.0 in the case where the product of the cyclic coefficient p and the multiplication value q is greater than 1.0. Although FIG. 15 indicates the movement amounts as "high", "medium", and "low", the movement amounts may be divided into ranges as appropriate for the method of detecting the movement amount.

Through this, the post-filtering process detected value V1Hf(n) can easily adapt to the ideal value under conditions where signal level gaps are not easy to see with respect to the subject, and fluctuations in the detected value V1Hf(n) can be reduced under conditions where the gaps are easy to see with respect to the subject. Accordingly, the adaptability of the detected value V1Hf(n) to the ideal value and the effect of reducing fluctuations in the detected value caused by power source noise or the like can be optimized.

As described thus far, by detecting the movement amount of the subject and changing the cyclic coefficient in accordance with the detected movement amount, the adaptability of the post-filtering process detected value V1Hf(n) to the ideal value in accordance with the subject and the effect of reducing fluctuations in the detected value caused by power source noise or the like can be optimized.

(8) Spectral Properties of Color Filter

As described earlier, a color filter used in an image sensor typically has a Bayer array cyclic structure using three primary color filters, namely R, G, and B. Of the pixel signals output from the pixels having the stated R, G, and B three-color color filter, humans have vision characteristics that are extremely sensitive to G pixels but are less sensitive to R and B pixels than to G pixels. In other words, signal level gaps are more noticeable for G pixels, and are less noticeable for R and B pixels than for G pixels. Thus differences occur in the way in which level gaps are visually perceived (the limit value); as an example, signal level gaps begin to be noticeable for G pixels when ±10 LSB is exceeded, whereas such gaps are not noticeable until ±20 LSB for R and B pixels.

Accordingly, in the present embodiment, different cyclic coefficients are set for the R, G, and B pixels by taking the G pixel as a reference (1.0) and multiplying the cyclic coefficients p for the R pixels and the B pixels by the multiplication value q. Specifically, by setting the multiplication value q for the R and B pixels to values greater than 1.0, which is the value for G pixels, a state where fluctuations in the post-filtering process detected value V1Hf(n) are below the limit value at which signal level gaps begin to appear in the image can be maintained while accelerating the adaptation to the ideal value. The detected value V1H(n) changes suddenly when power is turned on, when the image sensor driving method is switched, and so on in particular, and such sudden changes appear as signal level gaps even in the R and B pixels, which have low sensitivities to such sudden changes. In other words, it is preferable to set the cyclic coefficient of the R and B pixels to a cyclic coefficient that accelerates the adaption to the ideal value to the greatest extent possible while also ensuring that the detected value stays below the limit value at which signal level gaps begin to appear in the image (±20 LSB) when the correction value is calculated.

FIG. 16 illustrates multiplication values q to be multiplied with the cyclic coefficient, for each of the color filter colors. The G pixel serves as a reference, and thus the multiplication value q for G pixels is set to 1.0×. In the present embodiment, the multiplication value q is set to 2.0× for the R pixels and the B pixels. Although the multiplication value q is set to 2.0× for the R and B pixels in the present embodiment, the multiplication result is assumed to be 1.0 in the case where the product of the cyclic coefficient p and the multiplication value q is greater than 1.0.

By doing so, the detected value V1Hf(n) can be caused to quickly adapt even to sudden changes in the ideal value while keeping fluctuations in the post-filtering process detected value V1Hf(n) below the limit value at which signal level gaps begin to appear in the image when the correction value is calculated.

As described above, different cyclic coefficients are set for the R pixels, the G pixels, and the B pixels, and the cyclic coefficient is optimized for each pixel. By doing so, the post-filtering process detected value V1Hf(n) can be caused to quickly adapt even to sudden changes in the ideal value while keeping fluctuations in the detected value V1Hf(n) below the limit value at which signal level gaps begin to appear in the image when the correction value is calculated, for each pixel color.

(9) Changing Determination Level in Accordance with Gain Switch in Column Amp Group 130

In low-light situations, the gain of the column amp group 130 of the image sensor 1 may be switched in order to improve the S/N ratio of the image signal. A noise component arising in the circuits subsequent to the column amp group 130 can be reduced relative to the pixel signal by switching the gain of the column amp group 130, which makes it possible to improve the S/N ratio.

The present embodiment assumes that the gain of the column amp group 130 is analog gain, and that the column amp group 130 has discrete gain settings. Specifically, settings of 2× and 4× are provided, where 2× is the normal setting, which is switched to 4× in low-light situations.

In the case where a pixel signal having a signal level near the determination level Vs has been amplified by switching the gain setting of the column amp group 130, it is necessary to change the determination level Vs to a high level in accordance with the gain resulting from the gain switch. This is because the position in the image at which signal level gaps arise will change suddenly in the unlikely event that a level gap occurs. This is particularly noticeable in images where there are many pixels in which a signal level gap occurs after the gain of the column amp group 130 is switched. The present embodiment will describe a method for setting the cyclic coefficient when changing the determination level Vs in accordance with the gain of the column amp group 130 being switched.

In the present third embodiment, the setting value of the multiplication value q for multiplication with the cyclic coefficient p is changed in accordance with the determination level Vs changed after the gain of the column amp group 130 has been switched. FIG. 17 illustrates multiplication values q to be multiplied with the cyclic coefficient, for each determination level Vs after the gain of the column amp group 130 has been switched. Here, it is assumed that the AD conversion range is a maximum of 12 bits (0 to 4095 LSB), and that a reference value for the multiplication value q (×1.0) ensures that the determination level Vs after the gain of the column amp group 130 has been switched is in a range of 0 to 511 LSB, where level gaps are least noticeable.

In the case where the determination level Vs after the gain of the column amp group 130 has been switched is 2048 to 4095 LSB, the multiplication value q is set to 4.0× relative to the stated reference value, and in the case where the determination level Vs is 512 to 2047 LSB, the multiplication value q is set to 2.0× relative to the reference value. In other words, the adaptability is improved by setting the cyclic coefficient to be higher as the level gaps become more noticeable. Although the multiplication value q is set to 4.0× in the case where the signal level is 2048 to 4095 LSB after the column amp switch in the present embodiment, the multiplication result is assumed to be 1.0 in the case where the product of the cyclic coefficient p and the multiplication value q is greater than 1.0.

Through this, the post-filtering process detected value V1Hf(n) is caused to quickly converge near the ideal value by temporarily increasing the cyclic coefficient in the case where the determination level Vs is high after the gain of the column amp group 130 has been switched, or in other words, in the case where signal level gaps in the S signal are noticeable. On the other hand, fluctuations in the post-filtering process detected value V1Hf(n) are reduced by keeping the cyclic coefficient low in the case where the determination level Vs is low after the gain of the column amp group 130 has been switched, or in other words, in the case where signal level gaps in the S signal are less noticeable. It is also possible to apply the multiplication value only after the gain of the column amp group 130 has been switched.

As described thus far, when the determination level is to be changed in accordance with the gain of the column amp group 130 being switched, the cyclic coefficient setting value is changed in accordance with the magnitude of the determination level Vs set after the gain of the column amp group 130 has been switched. Through this, the amount of time required for the post-filtering process detected value V1Hf(n) to converge near the ideal value and the effect of reducing fluctuations in the detected value caused by noise can be optimized while maintaining a state where gaps are not easily noticeable in the image.

Although several examples of preferred filtering process methods have been described thus far, the cyclic coefficient may be determined taking a plurality of such methods into consideration. Furthermore, although the present embodiment describes the cyclic coefficient as a single example, the method for setting the cyclic coefficient with respect to various conditions is not necessarily limited to the content of the present embodiment, and the cyclic coefficient may be determined in accordance with change amounts in the ideal value caused by the conditions under which noise occurs, the temperature changing rate, the switching of driving of the image sensor, and so on.

Meanwhile, although the present embodiment describes the detected value V1H as the target for the filtering process, it is necessary to carry out the same processing on V1L, V2H, and V2L, as described earlier. By stabilizing the detected values V1H, V1L, V2H, and V2L, the correction values α and β can be stabilized. Although a filtering process such as that indicated by the aforementioned Formula (5) is carried out on the detected values V1L, V2H, and V2L as well, Formula (5) can be expressed as the following Formula (7) when Formula (5) is generalized for the detected values V1H, V1L, V2H, and V2L.

$$Vf(n)=V(n) \times p+Vf(n-1) \times (1-p) \quad (0 \leq p \leq 1) \quad (7)$$

In Formula (7), Vf(n) represents the post-filtering process detected value in the nth frame and V(n) represents a new detected value obtained during the readout period of dummy pixels obtained in the nth frame. Meanwhile, Vf(n−1) represents the post-filtering process detected value in the n−1th frame, and the cyclic coefficient is represented by p(0≤p≤1).

In addition to the aforementioned methods, a cyclic filter may be applied to each term in Formula (1) and Formula (2), which are obtained during the calculations for finding the correction values α and β. Specifically, a filtering process can also be carried out on a result of calculating V2H−V1H (an intermediate value) and a result of calculating V2L−V1L (an intermediate value). By carrying out such processing, in the case where the same level of external noise arises in V2H and V1H, that noise can be canceled out and the cyclic coefficient can be set higher, and thus the post-filtering process detection difference value V2H−V1H can more quickly converge near the ideal value.

Which method to use may be determined in consideration of the arrangement of the dummy pixels for obtaining the detected value, the way in which the external noise occurs, and so on.

Fourth Embodiment

Hereinafter, a fourth embodiment of the present invention will be described. The image capturing apparatus used in the fourth embodiment has the same configuration as the image capturing apparatus described with reference to FIG. 1 in the first embodiment, and thus descriptions thereof will be omitted, and only the differences will be described.

As opposed to the configuration of the pixel section 110 illustrated in FIG. 5, the effective pixel region is divided into four parts in the horizontal direction in the fourth embodiment, as illustrated in FIG. 18. The regions are taken as an effective pixel region A, an effective pixel region B, an effective pixel region C, and an effective pixel region D, in that order from the left of the screen. In addition, corresponding to the effective pixel regions, the dummy pixel region is also divided into four parts in the horizontal direction, resulting in a dummy pixel region A, a dummy pixel region B, a dummy pixel region C, and a dummy pixel region D, in that order from the left of the screen. By dividing the regions into several regions in the horizontal direction, correction that is closer to the ideal value can be carried out even in the case where the performance of the AD converters varies in the horizontal direction.

In the aforementioned third embodiment, the detected values V1H, V1L, V2H, and V2L are obtained using the dummy pixels for the entire screen, but in the present fourth embodiment, the detected values are obtained for each of the regions A to D obtained through the stated division. The same processing as in the third embodiment is carried out for the detected values V1H, V1L, V2H, and V2L calculated for each of the stated regions, thus ensuring that signal level gaps cannot be seen.

As described thus far, a plurality of regions are obtained through division in the horizontal direction, and the post-filtering process detected value is calculated for each region. Through this, detected values that are closer to the ideal value can be obtained even in the case where the performance of the AD converters varies in the horizontal direction, and furthermore, the same effects as those of the third embodiment can be achieved.

Although the first to fourth embodiments describe two types of ramp signals having different slopes, the same techniques can be applied for three or more types of slopes as well, and the present invention is not intended to be limited by the number of types of ramp signal. Meanwhile, it is necessary to carry out the filtering process on the correction values calculated using the dummy pixel region, and although the first embodiment describes exemplary methods for obtaining and calculating the correction values and so on, the present invention is not intended to be limited thereto.

Finally, although the first to fourth embodiments describe configurations in which a single column ADC having a small circuit scale is provided for each column in the image sensor 1, the present invention is not intended to be limited thereto. For example, a configuration in which a plurality of column ADCs are provided in each column, each carries out AD conversion using ramp signals having respectively different slopes, and one of the resultants thereof is selected may be used; or a configuration such as that disclosed in Japanese Patent Laid-Open No. 2013-009087 may be used. Japanese Patent Laid-Open No. 2013-009087 discloses a column amp circuit within an image sensor, in which AD conversion is carried out by selectively using one of a first ramp signal and a second ramp signal having a lower slope than the first ramp signal on a pixel-by-pixel basis in accordance with the level of a pixel signal. In other words, the present invention can be applied in any technique that configures each frame of an image by selectively using a pixel signal AD-converted using one of a plurality of ramp signals having different slopes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-010676 and 2015-010677, both filed on Jan. 22, 2015, which are hereby incorporated by reference herein in their entirety.

What is claimed is:

1. An image capturing apparatus comprising:
an analog-digital converter unit that converts an analog signal into a digital signal using a plurality of reference signals having mutually different slopes; and
a voltage supply unit that supplies analog signals having a predetermined plurality of different output levels to the analog-digital converter; and
a calculator that calculates a ratio of the plurality of different slopes and an offset amount on the basis of a plurality of digital signals obtained by converting the analog signals having the plurality of different output levels using the plurality of reference signals, and calculates a correction coefficient for correcting digital signals obtained by the analog-digital conversion unit converting analog signals output from a pixel section of an image sensor on the basis of the ratio of slopes and the offset amount,
wherein the correction coefficient includes the ratio of slopes and an offset correction value.

2. The image capturing apparatus according to claim 1, wherein when the offset correction value is represented by $\beta f(n)$, the offset amount is represented by $\beta(n)$, the offset correction value calculated in the previous frame is represented by $\beta f(n-1)$, and the cyclic coefficient is represented by p, the calculation unit finds the offset correction value through $$\beta f(n)=\beta(n)\times p+\beta f(n-1)\times(1-p),\ (0\leq p\leq 1).$$

3. The image capturing apparatus according to claim 1, wherein the cyclic coefficient is set to 0 in the case where a difference between the offset amount and the offset correction value calculated in the previous frame is greater than a threshold.

4. The image capturing apparatus according to claim 1, wherein the cyclic coefficient is set to a higher value in the case where an absolute value of a difference between the offset amount and the offset correction value calculated in the previous frame is within a predetermined range than in the case where the absolute value of the difference is lower than the predetermined range.

5. The image capturing apparatus according to claim 1, further comprising a temperature detection unit that measures a temperature,
wherein the cyclic coefficient is set to a higher value in the case where an absolute value of a changing rate of the temperature measured by the temperature detection unit is within a predetermined range than in the case where the absolute value of the changing rate is lower than the predetermined range.

6. The image capturing apparatus according to claim 1, wherein the cyclic coefficient is set to a lower value the lower a contrast is in one frame's worth of an image output from the pixel section of the image sensor.

7. The image capturing apparatus according to claim 1, wherein the cyclic coefficient is set to a higher value in the case where a framerate used when reading out the pixel section of the image sensor is within a predetermined range than in the case where the framerate is higher than the predetermined range.

8. The image capturing apparatus according to claim 1, wherein an image obtained by reading out the pixel section of the image sensor includes frames used for video output and frames not used for video output, and
the cyclic coefficient is multiplied by a higher value in the case where an absolute value of a difference between the offset correction value calculated for the frames used for video output and the offset correction value calculated for frames not used for video output is within a predetermined range than in the case where the absolute value of the difference is higher than the predetermined range.

9. The image capturing apparatus according to claim 1, further comprising a movement amount detection unit that detects a movement amount of a subject,
wherein the cyclic coefficient is multiplied by a higher value in the case where the movement amount detected by the movement amount detector is within a predetermined range than in the case where the detected movement amount is lower than the predetermined range.

10. The image capturing apparatus according to claim 1, wherein the pixel section of the image sensor is covered by a Bayer array primary color filter, and
the correction coefficient for correcting a digital signal corresponding to a pixel covered by a red or blue filter is calculated by multiplying the cyclic coefficient by a higher value than the correction coefficient for correcting the digital signal corresponding to a pixel covered by a green filter.

11. The image capturing apparatus according to claim 1, wherein the analog-digital conversion unit outputs a digital signal obtained through conversion using a first reference signal in the case where the output level of the analog signal output from each pixel that constitutes the pixel section of the image sensor is lower than a predetermined determination level, and outputs a digital signal obtained through conversion using a second reference signal whose slope is higher than the slope of the first reference signal in the case where the output level is greater than or equal to the determination level.

12. The image capturing apparatus according to claim 11, further comprising an amplifier that amplifies the analog signal output from each pixel that constitutes the pixel section of the image sensor before the analog signal is converted by the analog-digital converter,
wherein in the case where a gain of the amplifier has changed, the cyclic coefficient is multiplied by a higher value in the case where a value changed so that the determination level corresponds to the change in the gain is within a predetermined range than in the case where the value is lower than the predetermined range.

13. The image capturing apparatus according to claim 1, further comprising a corrector that corrects the digital signal obtained by carrying out analog-digital conversion on the analog signal output from the pixel section of the image sensor using the correction coefficient calculated by the calculator.

14. The image capturing apparatus according to claim 1, wherein the pixel section of the image sensor includes dummy pixels that do not have photoelectric conversion elements, and the voltage supplier supplies the analog signals having the predetermined plurality of different output levels during a readout period for the dummy pixels.

15. The image capturing apparatus according to claim 1, wherein the pixel section of the image sensor is divided into a plurality of regions and the calculator calculates the correction coefficient for each of the plurality of regions obtained through the division.

16. The image capturing apparatus according to claim 1, wherein the analog-digital converter is provided in each of columns in the pixel section of the image sensor.

17. A control method for an image capturing apparatus, the method comprising:
supplying analog signals having a predetermined plurality of different output levels to an analog-digital converter;
converting the analog signals having the plurality of different output levels into a plurality of digital signals using a plurality of reference signals having mutually different slopes;
calculating a ratio of the plurality of different slopes and an offset amount on the basis of the plurality of digital signals; and
calculating a correction coefficient for correcting digital signals obtained by carrying out analog-digital conversion on analog signals output from a pixel section of an image sensor on the basis of the ratio of slopes and the offset amount,
wherein the correction coefficient includes the ratio of slopes and an offset correction value.

18. The control method for an image capturing apparatus according to claim 17, wherein the pixel section of the image sensor is divided into a plurality of regions, and in the calculating, the correction coefficient is calculated for each of the plurality of regions obtained through the division.

19. The control method for an image capturing apparatus according to claim 17, further comprising correcting the digital signal obtained by carrying out analog-digital conversion on the analog signal output from the pixel section of the image sensor using the correction coefficient calculated in the calculating.

20. The image capturing apparatus according to claim 1, wherein the calculator calculates correction coefficient on a frame-by-frame basis.

21. The image capturing apparatus according to claim 1 wherein the offset correction value is obtained by carrying out a filtering process that performs weighted adding of the offset amount and the offset correction value calculated in a previous frame using a cyclic coefficient.

22. The control method apparatus according to claim 17, wherein the correction coefficient is calculated on a frame-by-frame basis.

23. The control method apparatus according to claim 17, wherein the offset correction value obtained by carrying out a filtering process that performs weighted adding of the offset amount and the offset correction value calculated in a previous frame using a cyclic coefficient.

* * * * *

UNITED STATES PATENT AND TRADEMARK OFFICE
CERTIFICATE OF CORRECTION

PATENT NO. : 9,736,406 B2  
APPLICATION NO. : 15/001944  
DATED : August 15, 2017  
INVENTOR(S) : Takayuki Kimura Page 1 of 1

It is certified that error appears in the above-identified patent and that said Letters Patent is hereby corrected as shown below:

In the Claims

Column 37, Line 40, delete "the cyclic coefficient" and insert -- a cyclic coefficient --

Column 37, Line 46, delete "the cyclic coefficient" and insert -- a cyclic coefficient --

Column 37, Line 51, delete "the cyclic coefficient" and insert -- a cyclic coefficient --

Column 37, Line 60, delete "the cyclic coefficient" and insert -- a cyclic coefficient --

Column 37, Line 67, delete "the cyclic coefficient" and insert -- a cyclic coefficient --

Column 38, Line 4, delete "the cyclic coefficient" and insert -- a cyclic coefficient --

Column 38, Line 13, delete "the cyclic coefficient" and insert -- a cyclic coefficient --

Column 38, Line 24, delete "the cyclic coefficient" and insert -- a cyclic coefficient --

Column 38, Line 35, delete "the cyclic coefficient" and insert -- a cyclic coefficient --

Column 38, Line 56, delete "the cyclic coefficient" and insert -- a cyclic coefficient --

Signed and Sealed this  
Third Day of April, 2018

Andrei Iancu  
*Director of the United States Patent and Trademark Office*